US00RE36999E

United States Patent [19]

Yonemitsu et al.

[11] E Patent Number: Re. 36,999

[45] Reissued Date of Patent: Dec. 26, 2000

[54] VIDEO SIGNAL CODING METHOD

[75] Inventors: Jun Yonemitsu, Tokyo, Japan; Barry D. Andrews, Stanford, Calif.

[73] Assignee: Sony Corporation, Tokyo, Japan

[21] Appl. No.: 08/321,415

[22] Filed: Oct. 12, 1994

Related U.S. Patent Documents

Reissue of:

[64] Patent No.: 5,155,593
Issued: Oct. 13, 1992
Appl. No.: 07/588,932
Filed: Sep. 27, 1990

[30] Foreign Application Priority Data

Sep. 27, 1989 [JP] Japan ..... P1-253398

[51] Int. Cl.[7] ..... H04N 7/12

[52] U.S. Cl. ..... 348/413; 348/411

[58] Field of Search ..... 348/411, 412, 348/413, 399–409; H04N 7/12

[56] References Cited

U.S. PATENT DOCUMENTS

| | | | |
|---|---|---|---|
| 4,141,034 | 2/1979 | Netravali et al. | 348/396 |
| 4,202,011 | 5/1980 | Koga . | |
| 4,383,272 | 5/1983 | Netravali et al. . | |
| 4,562,468 | 12/1985 | Koga | 348/413 |
| 4,651,207 | 3/1987 | Bergmann et al. . | |
| 4,725,885 | 2/1988 | Gonzales et al. | 348/411 |
| 4,727,422 | 2/1988 | Hinman . | |
| 4,743,967 | 5/1988 | Takenaka et al. | 348/412 |
| 4,802,006 | 1/1989 | Iinuma et al. | 348/412 |
| 4,837,618 | 6/1989 | Hatori et al. . | |
| 4,838,685 | 6/1989 | Martinez et al. . | |
| 4,853,780 | 8/1989 | Kojima et al. | 348/412 |
| 4,951,140 | 8/1990 | Ueno et al. | 348/413 |
| 4,982,285 | 1/1991 | Sugiyama . | |
| 4,985,768 | 1/1991 | Sugiyama . | |

OTHER PUBLICATIONS

Universitat Hannover : Institut fur Theoretische Nachrichtentechnik und Informationsverarbeitung: Thomas Micke—Diplomarbeit "Vergleich eines pradiktiven und eines interpolativen bewegungskompensierenden Codierverfahrens fur Fernsehbildsignale", Hannover, im Apr. 1986.

Kummerfeldt G. et al.: "Coding Television Signals at 320 and 64 KBITS/S", Proceedings of the SPIE, vol. 594, Jan. 1, 1985, pp. 119–128, XP000567146.

*Primary Examiner*—Michael Lee

*Attorney, Agent, or Firm*—Frommer Lawrence & Haug, LLP.; William S. Frommer; Dennis M. Smid

[57] ABSTRACT

In a method for encoding successive frames of a digital motion video signal in the form of compressed digital data including an intraframe coded signal and a plurality of interframe coded signals, a first frame of the digital motion video signal is encoded to form one of an intraframe coded signal and an interframe coded signal to produce a compressed digital signal; the compressed digital signal is decoded to form a decoded signal; a plurality of predicted video signal frames are produced representing a second frame of the digital motion video signal other than the first frame, at least one of the plurality of predicted video signal frames being produced with the use of the decoded signal and a motion vector representing motion between frames of the digital motion video signal; the plurality of predicted video signal frames are compared with the second frame of the digital motion video signal for producing a plurality of difference data each corresponding with a respective one of the plurality of predicted video signal frames; one of the predicted signal frames having a smallest corresponding difference data is selected; and an interframe coded signal of the compressed digital data corresponding to the selected one of the predicted video signal frames is generated.

13 Claims, 11 Drawing Sheets

VIDEO SIGNAL CODING METHOD

Matter enclosed in heavy brackets [ ] appears in the original patent but forms no part of this reissue specification; matter printed in italics indicates the additions made by reissue.

BACKGROUND OF THE INVENTION

The present invention relates to video signal coding methods and, more particularly relates to such methods which are suitable for use in transmitting a moving picture video signal.

Conventionally, in a moving picture video signal communication system, such as a conference system for a video telephone system, a moving picture video signal is transmitted to a remote point via a transmission line. It has been proposed to efficiently utilize the limited capacity of the transmission line by transmitting less than all of the successive frames of the signal according to a so-called frame skipping process. The receiver reproduces the frames that have been skipped by the transmitter by interpolation based on picture information for the frames preceding and following the skipped frames with the use of motion vectors transmitted in place of the skipped frames (refer to Japanese Patent Publication No. 60-28392).

Since the motion vectors include less information than complete frames, it is theoretically possible to achieve efficient transmission of significant moving picture information in this manner. In practice, however, it is not always possible for the transmission apparatus to generate accurate motion vector information in the frame skipping process, and in the event that inaccurate motion vectors are transmitted in this fashion, the pictures reproduced by interpolation at the receiver can be objectionably poor in quality.

One type of transmission apparatus codes moving picture information in the form of unitary transmission blocks each including, for example, eight pixels per line by eight lines of the video signal to be transmitted. With the use of such apparatus, the contents of the pictures generated by interpolation at the receiver can become discontinuous in the event that the motion vectors for the transmitted unitary blocks are inaccurate and pictures reproduced with such motion vectors are likewise objectionably poor.

SUMMARY AND OBJECTS OF THE INVENTION

It is an object of the present invention to provide a video signal coding method which avoids the problems and disadvantages of the transmission methods described hereinabove.

It is another object of the present invention to provide a video signal coding method having the ability to transmit high quality picture data;

It is a further object of the present invention to provided a video signal coding method which produces encoded data in compressed form for efficiently utilizing the capacity of a transmission line;

It is a still further object of the present invention to provide a video signal coding method in which a plurality of predictive picture data are each generated by respectively different predictive modes based upon motion vector data to represent a frame of a signal to be transmitted and in which the predictive picture data having the smallest error is selected for encoding.

In accordance with an aspect of the present invention, in a method for encoding successive frames of a digital motion video signal in the form of compressed digital data including an intraframe coded signal and a plurality of interframe coded signals, the method comprises the steps of: encoding a first frame of the digital motion video signal to form one of an intraframe coded signal and an interframe coded signal to produce a compressed digital signal; decoding the compressed digital signal to form a decoded signal; producing a plurality of predicted video signal frames representing a second frame of the digital motion video signal other than the first frame, at least one of the plurality of predicted video signal frames being produced with the use of the decoded signal and a motion vector representing motion between frames of the digital motion video signal; comparing the plurality of predicted video signal frames with the second frame of the digital motion video signal for producing a plurality of difference data each corresponding with a respective one of the plurality of predicted video signal frames; selecting one of the predicted video signal frames having a smallest corresponding difference data; and generating an interframe coded signal of the compressed digital data corresponding to the selected one of the predicted video signal frames.

The above, and other objects, features and advantages of the invention, will be apparent in the following detailed description of an illustrative embodiment thereof which is to be read in connection with the accompanying drawings forming a part hereof, and wherein corresponding parts and components are identified by the same reference numerals in the several views of the drawings.

BRIEF DESCRIPTION OF THE DRAWINGS

FIGS. 5(A), 5(B) are timing charts for use in explaining the operation of the transmission section of FIGS. 5(A), 5(B);

DETAILED DESCRIPTION OF CERTAIN PREFERRED EMBODIMENTS

Figure 1:
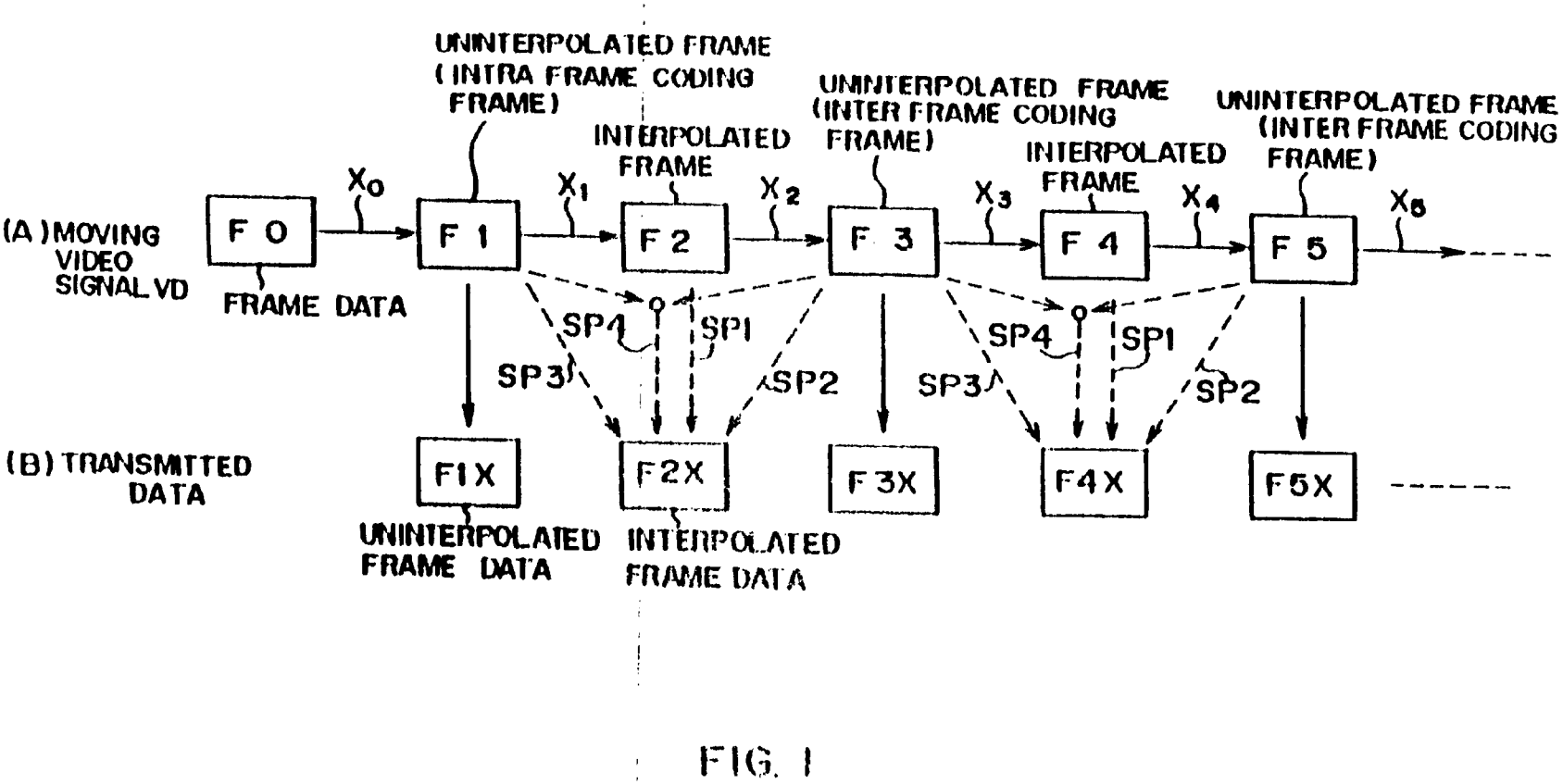
FIG. 1 schematically illustrates a video signal coding method in accordance with one aspect of the present invention.

With reference first to FIG. 1, a video signal coding method in accordance with one embodiment of the present invention is illustrated therein as a method of operating a moving picture signal transmission system. In the illustrated method, picture data in the form of successive frames including frames formed by interpolation are produced by a transmitter and transmitted thereby to a receiver.

As shown in line (A) of FIG. 1, a moving video signal VD to be encoded for transmission includes successive frames of data comprising an initial frame F0 and successively arranged frames F1, F2, F3, . . . . Motion vectors $x_0$, $x_1$, $x_2$, $x_3$, etc., represent motion respectively between the frames F0 and F1, F1 and F2, F2 and F3, F3 and F4, etc. The transmitter applies an interpolation process to the even numbered frames F2, F4, . . . , to thereby generate respective interpolated frame data F2X, F4X, etc. as illustrated in line (B) of FIG. 1 and transmits the interpolated frame data together with uninterpolated frame data F1X, F3X, F5X, . . . corresponding to the first, third, fifth, and following odd numbered frames which are uninterpolated, and the motion vectors $x_0$, $x_1$, $x_2$, $x_3$, . . . , collectively referred to as the transmitted data (herein, DATA).

Figure 2:
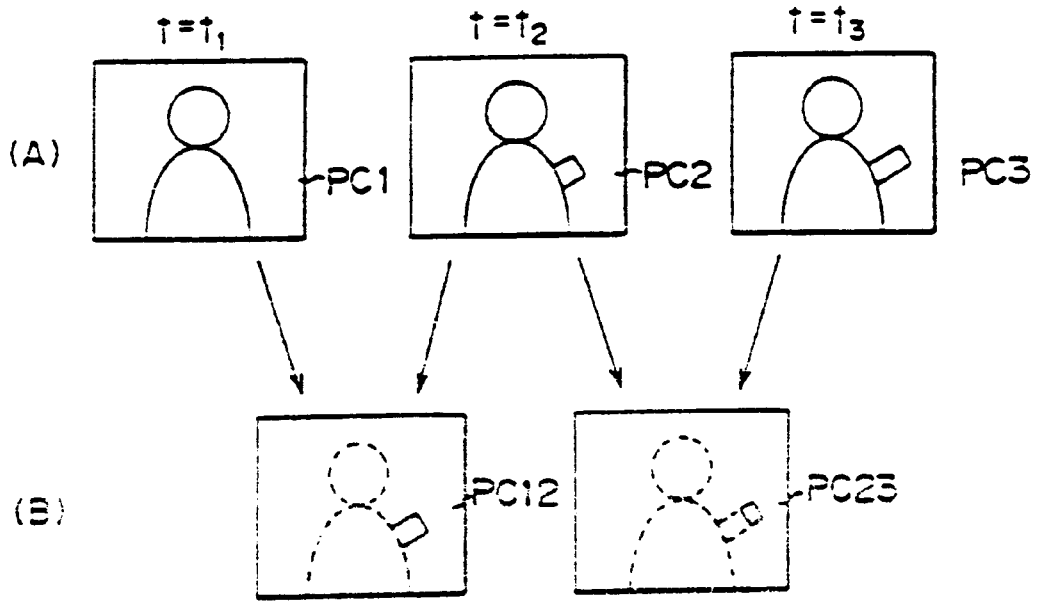
FIG. 2 illustrates a series of moving video pictures which schematically depict intraframe and interframe coding utilized in certain aspects of the present invention.
Figure 3:
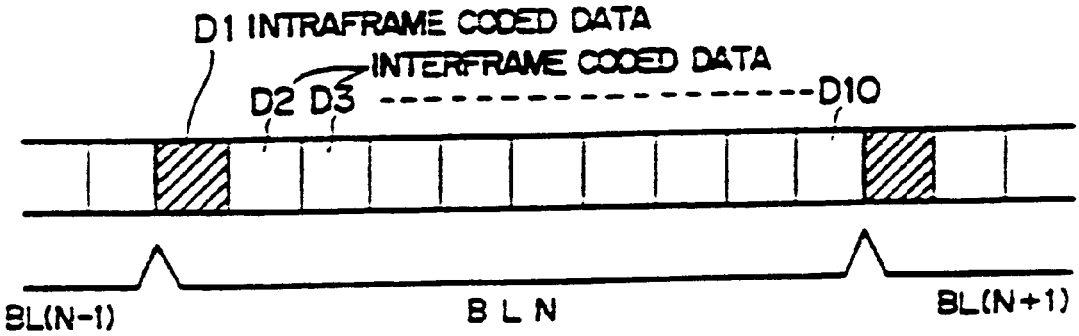
FIG. 3 is a generalized illustration of a data format employed in accordance with certain aspects of the present invention.

In the present illustrative embodiment, the DATA includes picture data processed by a high efficiency coding technique, an example of which is illustrated in FIGS. 2 and 3. For carrying out a high efficiency coding method, for example, sequentially occurring moving picture images PC1, PC2, PC3, and so on, as illustrated in line (A) of FIG. 2 are digitized at respective points in time $t=t_1$, $t_2$, $t_3$, . . . , to be encoded for transmission to a receiver. The digitized picture images are compressed in accordance with the high efficiency coding method either by intraframe coding or interframe coding, utilizing the high self-correlation typical of video signals to achieve data compression.

The intraframe coding process subjects the picture images to data compression, for example, by obtaining data representing differences between one-dimensionally and/or two-dimensionally adjoining pixels of each image arranged along the horizontal scanning lines thereof. In this fashion, each image may be expressed by an amount of data significantly compressed as compared with the amount of data necessary to represent all of the pixels of the corresponding image.

An interframe coding process is illustrated in line (B) of FIG. 2 wherein the frames PC12, PC23, and so on, represent respective differences (illustrated by solid lines therein) between sequentially adjoining frames PC1 and PC2, PC2 and PC3, . . . , respectively. The interframe data includes this difference data together with the motion vector data $x_0$, $x_1$, $x_2$, $x_3$, and so on, which represent picture movement. This interframe coded data is transmitted together with the intraframe coded data of the initial frame PC1 to a receiver. It will be appreciated that an even greater degree of data compression may be achieved by interframe coding as compared with intraframe coding, thus to effectively utilize the capacity of the transmission line employed through the use of the above described high efficiency coding method.

With reference also to FIG. 3, in the moving picture signal transmission system of the present embodiment, the picture data is divided into blocks, each having a predetermined number of frames therein. In the example of FIG. 3, ten frames of data are included in each block. The blocks of data as illustrated in FIG. 3 are designated sequentially BL(n−1), BL(N), BL(N+1), . . . , and are sequentially processed by high efficiency coding as described above for transmission.

Each of the blocks BL(N), (N= . . . N−1, N, N+1, . . . ) includes a first frame of data designated D1 which is processed by intraframe coding and second to tenth frames designated D2 through D10 sequentially following the first frame D1, which are processed by interframe coding. In the present embodiment, intraframe coding of the first frame in each block as described above produces data representing differences between all of the pixels of the first frame D1, so that the initial frame is reproduced at the receiver by successively adding the difference data representing the initial frame received thereby. The data of the second to tenth frames, as described above with reference to line (B) of FIG. 2, are converted to interframe coded data in the form of motion vector data and difference data representing differences between corresponding pixels of adjoining frames which have changed between frames. Accordingly, the first frame of data D1 exhibits a relatively lower compression efficiency, as it includes data representative of the differences between all of the pixels for that frame, whereas the data D2 to D10 for the second to tenth frames, exhibit a relatively higher compression efficiency.

The moving picture signal transmission system of the present embodiment generates a first frame of data F1X for transmission in the form of intraframe coded data based upon the data of the frame F1 as illustrated in line (A) of FIG. 1. The succeeding third, fifth etc. frames of the corresponding block are generated in uninterpolated form, designated respectively F3X, F5X, . . . in line (B) of FIG. 1, in the form of interframe coded data, each including respective motion vector data $(x_1+x_2)$, $(x_3+x_4)$, . . . , representative of movement from the next preceding odd numbered frame F1, F3, . . . to an immediately succeeding odd numbered frame F3, F5, . . . for producing a predictive frame at the receiver for each such odd numbered interframe coded frame. The interframe coded data also includes data representing the differences between each such predictive frame and the corresponding original frame prior to encoding at the transmitter, in order to permit a full reconstruction of the original data.

The remaining even numbered frames of each block F2, F4, etc., are coded in the form of interpolated frame data respectively designated F2X, F4X, . . . , as illustrated in line (B) of FIG. 1, in a manner described hereinbelow. In this fashion, the system constructs each of the data blocks BL(N)(N= . . . , N−1, N, N+1, . . . ) so that each thereof includes ten frames of data in a form suitable for transmission.

The system of the present embodiment generates the interpolated frame data F2X, F4X, . . . , by comparing each of the original data F2, F4, . . . , with a plurality of predictive frames generated by encoding and then decoding selected ones of the intraframe and interframe coded frames and producing the plurality of predictive frames by transforming the decoded intraframe and interframe data with the use of the motion vector data $x_0$, $x_1$, $x_2$, $x_3$, . . . , as appropriate. The differences between the original frames F2, F4, . . . and each of the corresponding plurality of predictive frames are generated in order to determine which of the plurality of predictive frames provides the least error therewith. The motion vector data providing the least error for each frame is transmitted therefor together with the error data as the interpolated frame data for the respective frame.

More specifically, for each of the interpolated frames FK, (K=2, 4, . . . ), each hereinafter referred to as a "current frame", the system selects among four possible encoding methods. The first simply encodes the current frame data FK in the form of intraframe data. The second produces interframe coded data between the current frame F and the following frame F(K+1) and is provided in the form of a motion vector $[-x_k]$ between the data of frame F(K+1) and the current frame FK together with data representing the differences between (i) a frame image produced by transforming a decoded frame F(K+1) by means of the motion vector $[-x_k]$ to represent a predictive frame corresponding with the frame FK, and (ii) the data FK of the current frame.

The third method for encoding the even numbered frames corresponds with the second method, except that a decoded version of the preceding frame F(K−1) is utilized in place of the decoded version of the following frame F(K+1) and the corresponding motion vector $[x_{k-1}]$ is used in place of the motion vector $[-x_k]$. In accordance with the fourth method of encoding the even numbered frames, predictive frame data is produced in the form of an average of the predictive frames formed by transforming the decoded data of the frame F(K+1) with the use of the motion vector $[-x_k]$ and by transforming the decoded data F(K−1) with the use of the motion vector $[x_{k-1}]$. This predictive frame is subtracted from the current frame and the resulting difference is transmitted together with the motion vectors $[-x_k]$ and $[x_{k-1}]$.

The results of the four encoding methods described above are compared prior to transmission in order to determine which of the four provides the smallest error with respect to the current (unencoded) frame data and the corresponding interpolated frame data therefor is transmitted as described above. By selecting the method producing the least error, it is thus possible to provide the highest quality reproduced pictures at the receiver while minimizing the amount of data to be transmitted.

Figure 4:
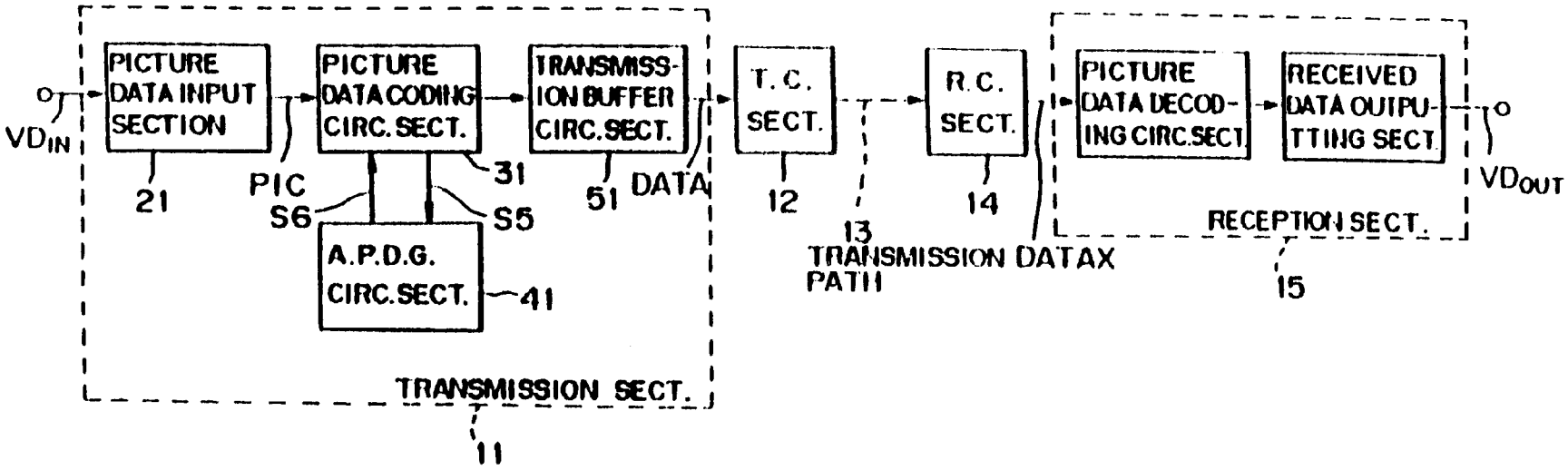
FIG. 4 is an overall block diagram of a moving video signal transmission system for carrying out a method in accordance with the present invention.

With reference now to FIG. 4, a picture signal transmission system operative in accordance with the above described encoding method is illustrated therein. In the system of FIG. 4, a moving picture video signal $VD_{IN}$ supplied to a transmission section 11 is converted thereby to DATA by high efficiency coding, as described above, and is transmitted by a transmission circuit section (T.C.Sect.) 12 to a reception circuit section (R.C.Sect.) 14 over a transmission path 13. The data received by the reception circuit section 14 is designated DATAX and is converted by a reception section 15 to a moving picture video signal $VD_{OUT}$ output thereby.

The transmission section 11 receives the input moving picture video signal $VD_{IN}$ at a picture data input section 21. With reference also to FIG. 5, a luminance signal Y and corresponding chrominance signals $C_R$ and $C_B$ which collectively constitute the input moving picture video signal $VD_{IN}$ are converted to digital form by respective analog-to-digital converter circuits 22, 23 and 24. The digitized luminance signal Y is supplied to a single-field suppressor circuit (S.S.Circuit) 25, while the digitized chrominance signals $C_R$ and $C_B$ are supplied to a single-field line decimator circuit 26. The data output by the circuits 25 and 26 is then supplied to a conventional time base converter circuit 27 which supplies time base converted data as the output picture data PIC of the picture data input section 21 (refer also to FIG. 4).

Figure 5A:
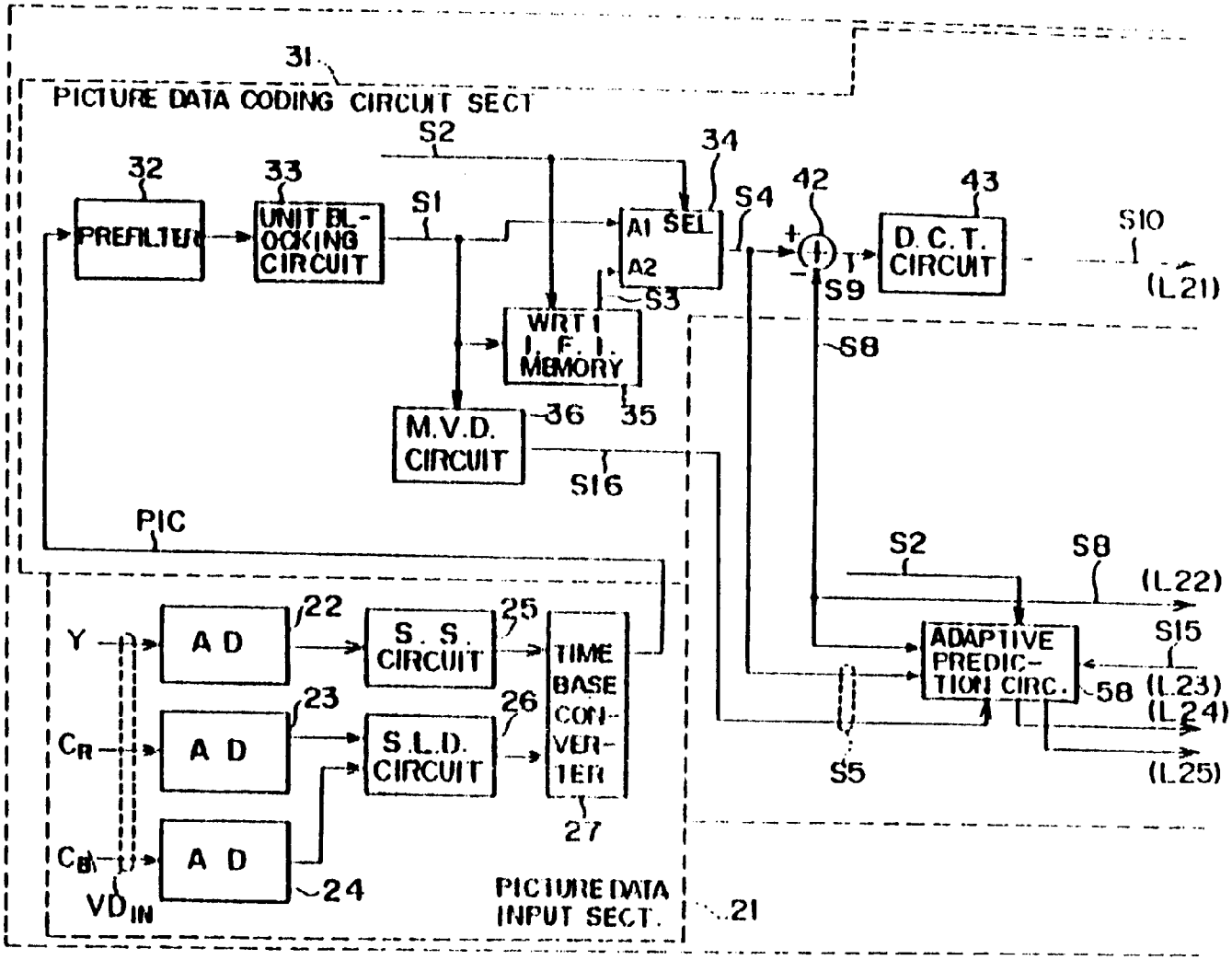
FIGS. 5(A), 5(B) are block diagrams of a transmission section of the system illustrated in FIG. 4.
Figure 5B:
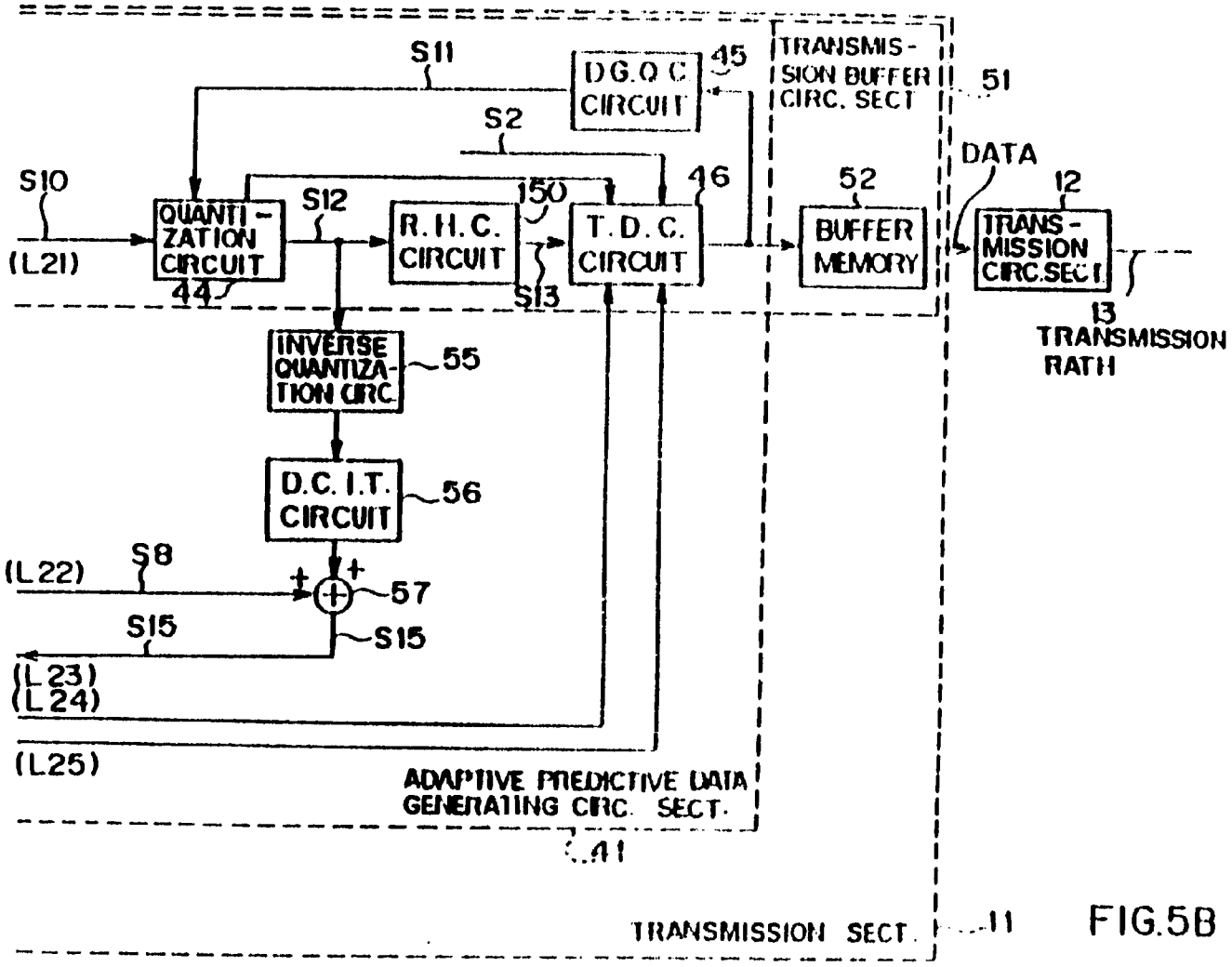

The data PIC supplied by the picture data input section 21 is provided thereby to the input of a picture data coding circuit section 31, illustrated in greater detail in FIG. 5(A), 5(B). The circuit section 31 receives the data PIC in a prefilter 32 including a frame memory. The data stored in the prefilter 32 is read therefrom to a unit-blocking circuit 33 in units of transmitted unitary block data, each constituting an array of eight pixels (in the horizontal direction of the picture data) by eight lines (in the vertical direction thereof). The transmitted unitary block data provided by circuit 33 is designated S1 and is supplied thereby to each of a first input A1 of a data selector circuit 34, an interpolated frame input memory (I.F.I. Memory) 35 including a frame memory, and a motion vector detector circuit (M.V.D. Circuit) 36. In the present embodiment, a selection input terminal SEL of the data selector circuit 34 and a write enable input terminal WRT1 of the interpolated frame input memory 35 receive a frame mode designating signal S2 which is supplied from a system controller (not illustrated for purposes of simplicity and clarity). With reference also to the timing chart of FIG. 6, $t_{10}$ to $t_{11}$, $t_{11}$ to $t_{12}$, . . . , $t_{16}$ to $t_{17}$, . . . , designate sequentially occurring points in time marking the commencement, respectively, of sequential frames represented by frame data F0, F1, . . . F6 . . . , as illustrated in line (A) thereof. With reference to line (B) of FIG. 6(A), 6(B), the system controller is operative to supply the frame mode designating signal S2 sequentially on a frame-by-frame basis commencing with the time $t_{10}$ in the form of interpolation frame coding mode data (designated INTPL), intraframe coding mode data (designated INTRA), data INTPL, interframe coding mode data (designated INTER), data INTPL, data INTER, data INTPL, and so on.

Figure 6A:
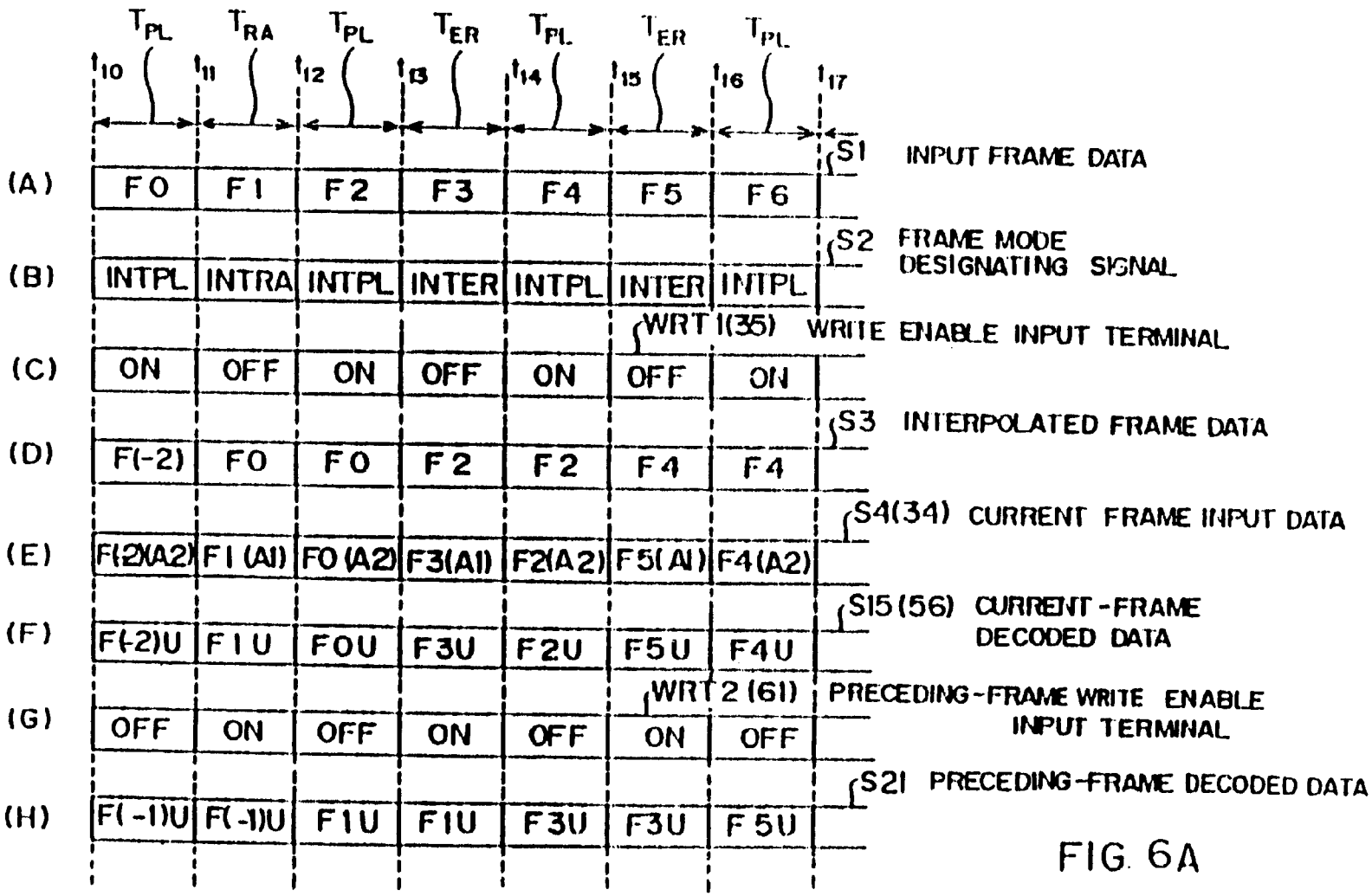

During the interpolation frame coding mode intervals (designated $T_{PL}$ in FIG. 6(A)), the frame mode designated signal S2 takes the form of the interpolation frame coding mode designating signal INTPL which brings the write enable input terminal WRT1 of the interpolated frame input memory 35 to a write state (indicated as an ON state in line (C) of FIG. 6(A)). Accordingly, during the intervals $T_{PL}$ the memory 35 writes the input frame data S1 (indicated in line (A) of FIG. 6(A)) received during the interpolation frame coding mode intervals $T_{PL}$ (namely, the frame data F0, F2, and so on, of the 0th, 2nd . . . frames). The thus written data is designated S3 in line (D) of FIG. 6 and takes the form of the frame data F0, F2, . . . , each of which is maintained thereby during the two successively following frame intervals. In this manner, the interpolated frame input memory 35 is enabled to repeatedly deliver the 0th, 2nd, . . . , frame data written during the interpolation frame coding mode intervals $T_{PL}$ for successive two frame intervals to an output thereof coupled with a second input terminal A2 of the data selector circuit 34 in the form of the interpolated frame data S3 (line (D) of FIG. 6(A)).

During the intervals in which the frame mode designating signal S2 takes the form of the interpolation frame coding mode data INTPL (that is, $t_{10}$ to $t_{11}$, $t_{12}$ to $t_{13}$, . . . ), the data selector circuit 34 selects its second input terminal A2, as indicated by the reference (A2) next to the frame identifying characters in line (E) of FIG. 6(A). Accordingly, the data selector circuit 34 simultaneously outputs the interpolated frame data S3 (that is, the data F(−2), F(0), F(2) . . . ) as the current frame input data S4 during the interpolation frame coding mode intervals $T_{PL}$. Both during the intraframe coding mode interval $T_{RA}$ and the interframe coding mode intervals $T_{ER}$, the data selector circuit 34 selects the first input terminal A1 thereof, that is, the input frame data S1 (F1, F3, . . . , as indicated by the characters (A1) in line E of FIG. 6(A)) as the current frame input data. Consequently, each of the even numbered frames F2, F4, F6, and so on, which are to be encoded by interpolation, is preceded in the current frame input data S4 by the odd numbered frames (F1, F3), (F3, F5), (F5, F7), . . . , which precede and follow corresponding even numbered frames of the input frame data S1. This reordering of the input frame data in the sequence of the current frame input data S4 enables predictive calculations of the interpolated frames F2, F4, F6, . . . , based on the odd numbered frames preceding and following each thereof. As is explained in greater detail below, these predictive calculations are carried out in an adaptive predictive data generating circuit section 41 (illustrated in FIG. 5(A)), the results of which are compared for selecting the interpolation mode which produces the smallest error.

With reference both to FIGS. 4 and 5(A), 5(B), a motion vector detector (M.V.D.) circuit 36 of the picture data coding circuit section 31 produces the motion vector data $x_0$, $x_1$, $x_2$, etc. (as indicated in FIG. 1) representing motion occurring between the respective frames (F0, F1), (F1, F2), (F2, F3), . . . , and supplies the same as data S16 as indicated in FIG. 5. The current frame input data S4, together with the motion vector data S16, are supplied from the picture data coding circuit section 31 to the adaptive predictive data generating circuit section 41 as input data S5 (refer to FIGS. 4 and 5(A), 5(B)). The circuit section 41 carries out the above mentioned predictive calculations utilizing the input data S5 and outputs selected predictive frame data S8 corresponding with a respective one of the current frame input data S4 which it supplies to the inverting input of a subtractor circuit 42. The non-inverting input of the subtractor circuit 42 is connected with the output o the data selector circuit 34 to receive the current frame input data S4 and, accordingly, outputs data representing the differences between the current frame input data S4 and the predictive frame data S8.

A discrete cosine transformation (D.C.T.) circuit 43 has an input connected with the output of the subtractor circuit 42 to receive the difference data S9 therefrom and is operative to further compress the data in accordance with a discrete cosine transformation function, supplying the thus processed data at an output thereof as transformed output data S10. The output of the discrete cosine transformation circuit 43 is connected with an input of a quantization circuit 44 for quantization of the data S10 in accordance with an adjustable quantization value in order to maintain the rate of data generation at an amount which does not exceed the data handling capacity of the system. The adjustable quantization value is determined by a data generation quantity calculating (D.G.Q.C.) circuit 45 having an output connected with a control input of the circuit 44 to provide a quantization control signal S11 thereto for controlling said quantization value. The operation of the circuit 45 is discussed in greater detail hereinbelow.

The transformed output data S10 is thus quantized by the quantization circuit 44 and as such is output as quantized data S12. The quantization circuit 44 supplies the quantized data S12 to the input of a run-length Huffman coding circuit 150 which, after run-length encoding the same in the form of data S13 suitable for transmission, provides the same to an input of a transmission data combining circuit 46 where the data S13 is combined with additional data to be transmitted, as described in greater detail hereinbelow. The transmission data combining circuit 46 provides the combined data at an output terminal thereof coupled with an input terminal of the data generation quantity calculating circuit 45 which utilizes the same in order to produce the quantization control data S11 for selecting the quantization values utilized by the quantization circuit 44.

The output of the transmission data combining circuit 46 is also coupled with an input of a buffer memory 52 of a transmission buffer circuit section 51. The buffer memory 52 stores the information supplied by the circuit 46 for transmission at a predetermined transmission speed as the DATA output by the transmission section 11 (refer to FIG. 4). By virtue of the control functions exercised by the quantization circuit 44 and the data generation quantity calculating circuit 45, the amount of data supplied to the buffer memory 52 does not exceed its storage capacity, so that the data generated in the transmission section 11 is reliably transmitted in full to the reception section 15.

In the interpolation mode (S2=INTPL), the adaptive predictive data generating circuit section 41 (refer to FIG. 5(A)) receives the quantized data S12 from the output of the quantization circuit 44 in order to decode the same for comparison with each of a plurality of predictive frames generated with the use of the motion vector data S16 received from the motion vector detector circuit 36. The predictive frame data providing the least error with respect to the decoded frame data is provided as the predictive frame data S8 to the subtraction circuit 42. At the same time, the adaptive predictive data generating circuit section 41 supplies the motion vector data used to produce the predictive frame data S8 for transmission by supplying the same to the transmission data combining circuit 46 to be included in DATA for transmission. More specifically, an inverse quantization circuit 55 of the adaptive predictive data generating circuit section 41 has an input connected with the output terminal of the quantization circuit 44 to receive the quantized data S12. The inverse quantization circuit 55 processes the quantized data S12 in order to restore it to the form of the data S10 output by the discrete cosine transformation circuit 43 and outputs the processed data to a discrete cosine inverse transformation (D.C.I.T.) circuit 56 which, in turn, produces picture data to which the predictive frame data S8 is added in an adding circuit 57 to yield current frame decoded data S15 representing the current frame input data S4 which has been previously encoded in the form of the data S12.

Figure 7A:
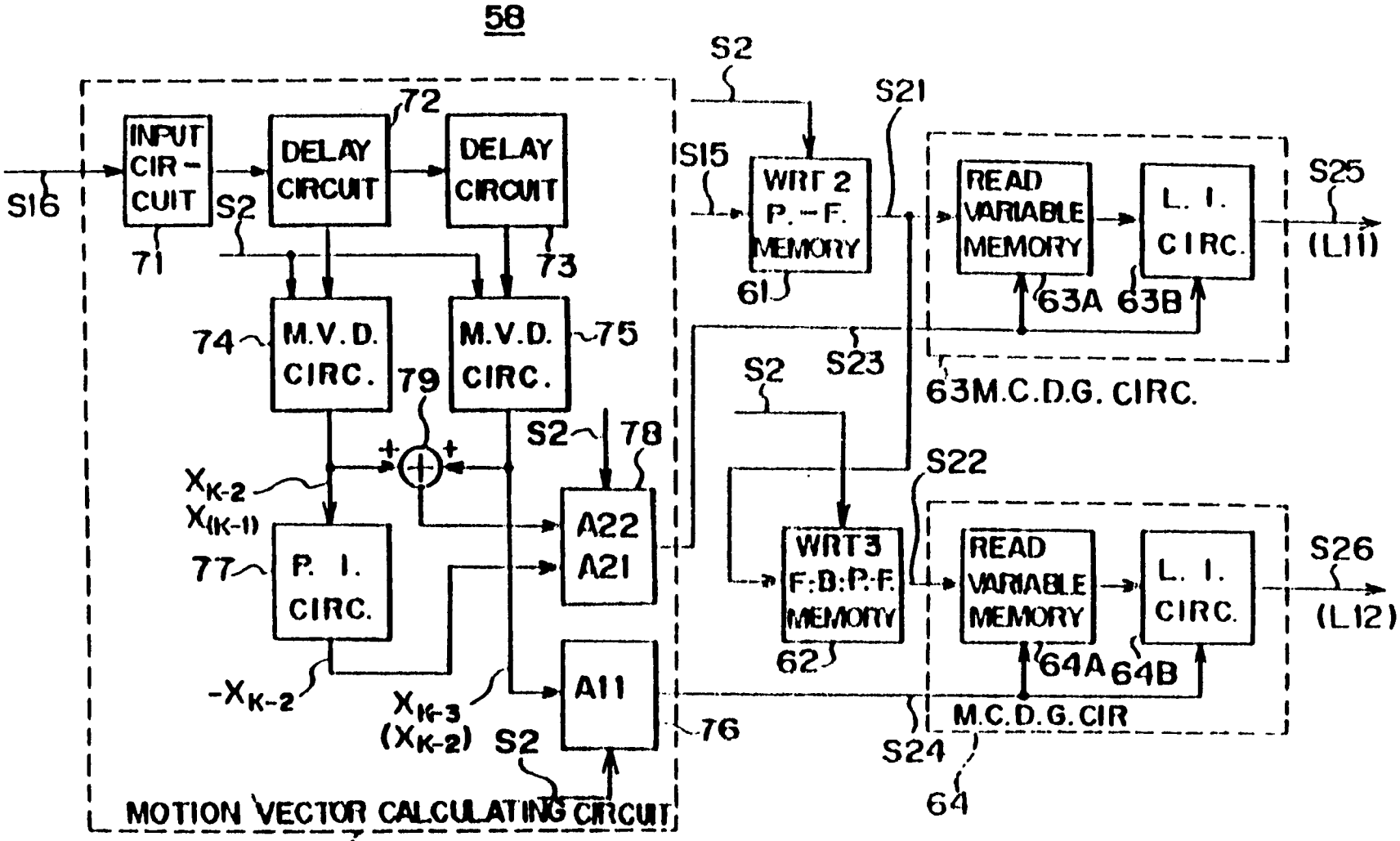
FIGS. 7(A), 7(B) are block diagrams of an adaptive predictive data generating circuit section included in the transmission section of FIGS. 5(A), 5(B)
Figure 7B:
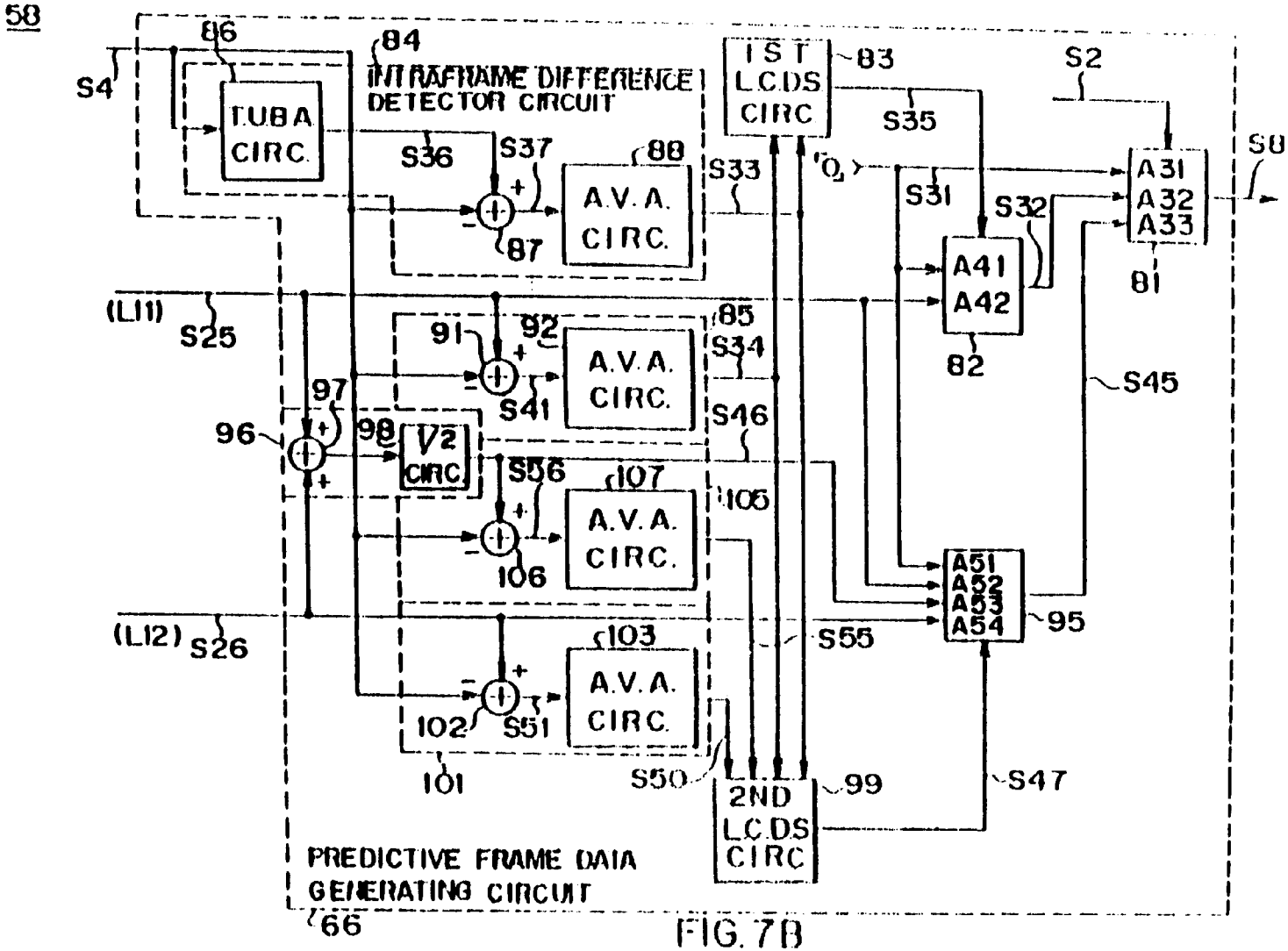

The adaptive predictive data generating circuit section 41 also includes an adaptive prediction circuit 58 having an input coupled with the adding circuit 57 to receive the current frame decoded data S15 and is operative to employ the same for producing the above-described plurality of predictive frame data based upon the motion vector data S16 which it receives at a further input from the motion vector detector circuit 36. With reference now to FIGS. 7(A), 7(B), the adaptive prediction circuit 58 is illustrated therein having a preceding-frame (P.-F.) memory 61 having an input coupled to receive the current frame decoded data S15 in order to write selected frames thereof under the control of the frame mode designating signal S2. At the same time, picture data previously stored therein is transferred as the frame before the preceding frame then being stored in memory 61 to a frame-before-preceding-frame (F.-B.-P.-F.) memory 62 in the form of preceding-frame decoded data S21. The memory 62 is operative in response to the frame mode designating signal S2 to write the preceding frame decoded data S21 as the frame-before-preceding-frame decoded data S22. The output of the preceding frame memory 61 is also coupled with the input of a movement correcting data generating circuit 63 in order to provide the preceding frame data S21 thereto. An output of the frame-before-preceding-frame memory 62 is coupled with an input of a further movement correcting data generating circuit 64 to provide the frame-before-preceding-frame decoded data S22 thereto.

Each of the movement correcting data generating circuits 63 and 64 includes respective read variable memories 63A and 64A which receive the preceding frame decoded data S21 and the frame-before-preceding-frame decoded data S22, respectively, for storing the same. The read variable memory 63A has an output coupled with an input of a linear interpolation (L.I.) circuit 63B. Each of the read variable memory 63A and the linear interpolation circuit 63B is provided with motion vector data S23 produced by a motion vector calculating circuit 65 of the adaptive prediction circuit 58 and are operative in response thereto to transform the preceding frame decoded data S21 to preceding/following-frame movement corrected data S25 which serves as predictive frame data for either a preceding or following frame depending upon the current operating mode (indicated by the frame mode designating signal S2).

The movement correcting data generating circuit 64 includes a respective linear interpolation (L.I.) circuit 64B having an input coupled with an output of the read variable memory 64A. Each of the read variable memory 64A and the linear interpolation circuit 64B has a further input coupled to receive correcting motion vector data S24 also provided by the motion vector calculating circuit 65 and are operative in response thereto to produce preceding frame movement corrected data S26 at an output of the linear interpolation circuit 64B representing a predictive frame of the current frame input data S4 when the system is operating in the interpolation mode (S2=INTPL) serving as a predictive frame corresponding with the current frame input data S4.

Figure 6B:
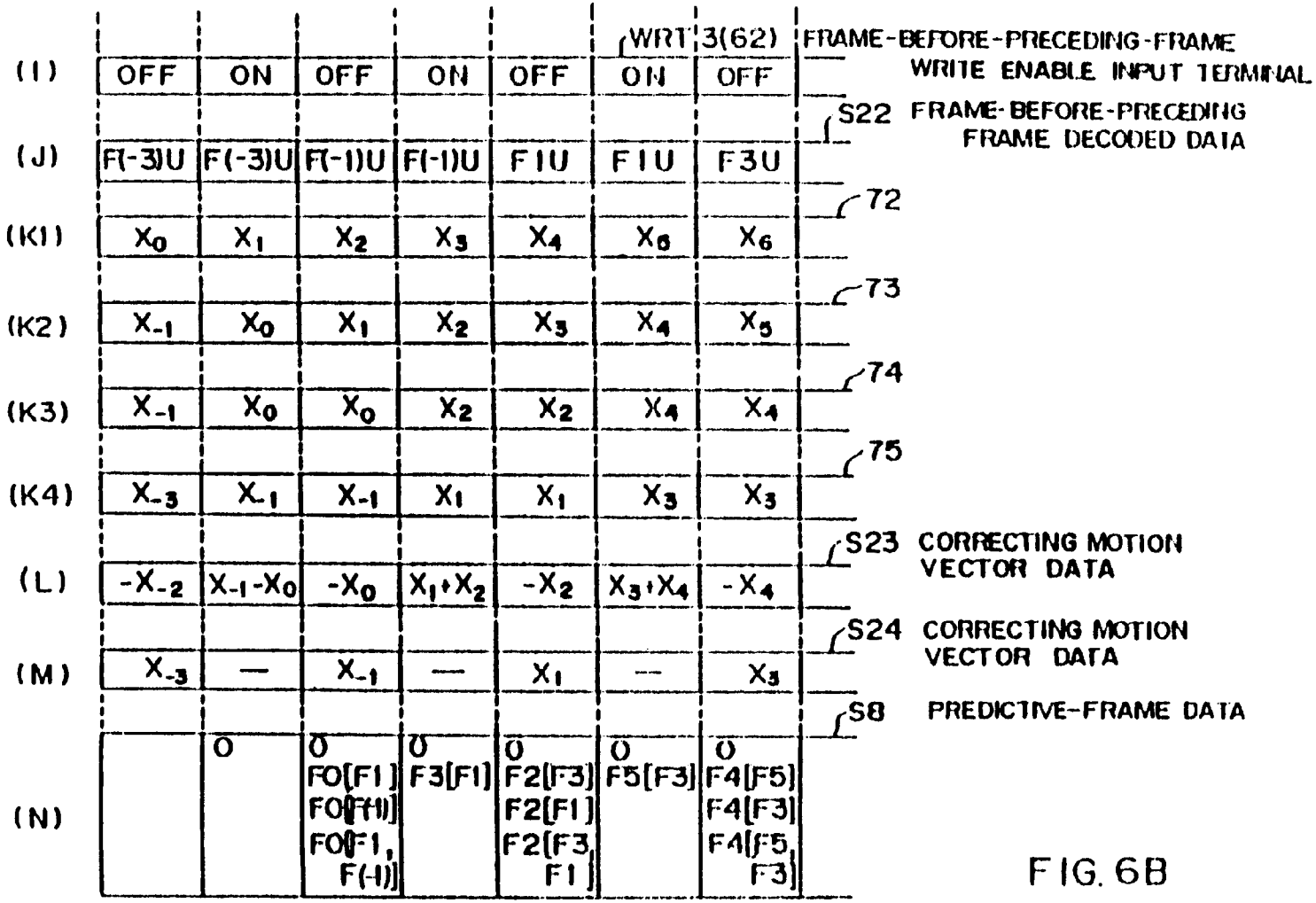

With reference to FIGS. 5(A), 5(B), 6(A), and 6(B), as the current frame input data S4 are supplied in the sequence F1, F0, F3, F2, F5, F4, . . . , the current frame decoded data S15 correspond thereto and are designated, respectively, F1U, F0U, F3U, F2U, F5U, F4U, . . . , (refer to lines (E) and (F) of FIG. 6) and are supplied to the input of the preceding frame memory 61 of FIG. 7(A). The preceding frame memory 61 has a write enable input terminal WRT2 for receiving the frame mode designating signal S2. The memory 61 is operative when S2=INTRA or S2=INTER to write the current frame decoded data S15 received at that time, as indicated in line (G) of FIG. 6(A). That is, as indicated in line (H) of FIG. 6(A), the memory 61 is operative to sequentially store the data F1U, F3U, F5U, . . . supplied as the current frame decoded data S15 when S2=INTRA or INTER and maintains the data thus stored for the two successively following frame intervals. Accordingly, if the preceding frame decoded data S21 stored by the memory 61 are designated F(K)U (K=1,3,5, . . . ), these data are each provided by the memory 61 during the intervals during which S1=F(K+1) and S1=F(K+2). For example, while the memory 61 stores the frame decoded data F1U, the frame data F2, F3 are sequentially provided as the input frame data S1.

The frame-before-preceding-frame memory 62 has a write enable terminal WRT3 provided with the frame mode designating signal S2 and is operative whenever S2=INTRA or S2=INTER to write the data then available as the preceding frame decoded data S21 output by the preceding frame memory 61, as indicated by line (I) of FIG. 6 and, like the memory 61, maintains the data thus written for the succeeding two frame intervals. That is, the memory 62 is operative to sequentially store the data F1U, F1U, F3U, . . . during the frame intervals $t_{14}$ to $t_{15}$, $t_{15}$, to $t_{16}$, $t_{16}$ to $t_{17}$, . . . at the same time that the respective frame data F4, F5, F6, . . . arrive as the input frame data S1.

Consequently, when the interpolated frame data F2, F4, F6, etc., are provided as the current frame input data S4 (refer to line (E) of FIG. 6(A)), the frame decoded data of the respective frames F3U and F1U, F5U and F3U, F7U and F5U, . . . which follow and precede such interpolated frame data are respectively produced as the preceding frame decoded data S21 (refer to line (H) of FIG. 6(A)) and the frame-before-preceding-frame decoded data S22 (refer to line (J) of FIG. 5(B)). The circuits 63 and 64 respectively produce the preceding/following-frame movement corrected data S25 and the preceding-frame movement corrected data S26 based upon the corresponding data S21 and S22 with the use of corresponding motion vector data S23 (refer to line (L) of FIG. 6(B)) and S24 (refer to line (M) of FIG. 6(B)) supplied by the motion vector calculating circuit 65.

The motion vector calculating circuit 65, as shown in FIG. 7(A), includes an input circuit 71 coupled to receive the motion vector data S16 from the motion vector detector circuit 36 and supplies the same (represented in sequence by $x_0$, $x_1$, $x_2$, $x_3$, . . . ) to the input of a first delay circuit 72 in the form of a one-frame delay memory. An output of the first delay circuit 72 is coupled with an input of a second delay circuit 73 in the form of a further one-frame delay memory, to provide the motion vector data S16 delayed by one frame thereto. The second delay circuit 73 delays the motion vector data by a further frame and supplies the two frame delayed motion vector data at an output thereof. A second output of the first delay circuit 72 is coupled with an input of a motion vector detector circuit 74, while the output of the second delay circuit 73 is coupled with an input of a further motion vector detector circuit 75. Each of the motion vector detector circuits 74 and 75 has a control input coupled to receive the frame mode designating signal S2 and is operative when S2=INTPL to write the motion vector data received thereby from the respective delay circuits 72 and 73 at that time. Accordingly, during each interpolation frame coding mode (S2=INTPL) when the input frame data takes the form FK (K=1, 2, . . . ), the delay circuits 72 and 73 provide the motion vector data $x_k$ and $x_{k-1}$, respectively, to the motion vector detector circuits 74 and 75 which store the same and provided continuously for the succeeding two frame intervals (see for example, line (K3) and line (K4) of FIG. 6).

Simultaneously with the provision of the input frame data S1 equal to FK (K= . . . , 1, 2, 3 . . . ) as indicated in line (A) of FIG. 6(A), the delay circuits 72 and 73 deliver the motion vector data $x_k$ and $x_{k-1}$ to the motion vector detector circuits 74 and 75, respectively (refer to lines (K1) and (K2) of FIG. 6(B). The motion vector data $x_k$ represents movement in the picture data from the current frame FK to the succeeding frame F(K+1), while the motion vector data $x_{k-1}$ represents movement of picture data from the frame F(K−1) preceding the current frame FK to the current frame FK. As noted above, the motion vector detector circuits 74 and 75 write the motion vector data $x_k$ and $x_{k-1}$ supplied thereto during the interpolation frame coding mode intervals $T_{PL}$ and store this data during the two succeeding frame intervals (refer to lines (K3) and (K4) of FIG. 6(B)).

Accordingly, since the data FK is supplied as the input frame data S1 during each interpolation frame coding mode interval $T_{PL}$, the motion vector data $x_k$, $x_{k-1}$, $x_{k-2}$, and $x_{k-3}$ are then provided by the circuits 72, 73, 74 and 75 respectively. Moreover, during the interframe coding mode intervals $T_{ER}$, the motion vector data $x_k$, $x_{k-1}$, $x_{k-1}$ and $x_{k-2}$ are then provided by the circuits 72, 73, 74 and 75, respectively.

With reference again to FIG. 7(A), 7(B), the motion vector calculating circuit 65 includes a data selector circuit 76 having an input terminal A11 coupled with the output of the motion vector detector circuit 75 and a control input coupled to receive the frame mode designating signal S2 for controlling the selection of the input terminal A11 for connection to an output terminal thereof. The circuit 65 also includes a polarity inverting (P.I.) circuit 77 having an input coupled with the output terminal of the motion vector detector circuit 74 and operative to invert the polarity of the motion vector data supplied thereto by the circuit 74. An adding circuit 79 of the circuit 65 has a first input coupled with the output terminal of the motion vector detector circuit 74 and a second input coupled with the output terminal of the motion vector detector circuit 75 and is operative to provide a signal representing the summation of the motion vector data output by the circuits 74 and 75 to an input terminal A22 of a further data selector circuit 78. A second input terminal A21 of the circuit 78 is coupled with the output terminal of the polarity inverting circuit 77 to receive the inverted motion vector data therefrom. The data selector circuit 78 also has a control terminal coupled to receive the frame mode designating signal S2 for controlling the selection of either of input terminals A21 or A22 for connection to an output terminal of the circuit 78.

During the interpolation mode (S2=INTPL) and while the data FK (K= . . . 2,4,6 . . . ) is received as the input frame data S1, the motion vector detector circuit 75 supplies the motion vector data $x_{k-3}$ representing motion between the data of the frame F(K−3) and the frame F(K−2). At this time, the data selector circuit 76 under the control of the frame mode designating signal S2 selects the input terminal A11 thereof thus to output the motion vector data $x_{k-3}$ which it supplies as the motion vector data S24 to the movement correcting data generating circuit 64 to which the frame-before-preceding-frame decoded data S22 is supplied.

At the same time, the motion vector detector circuit 74 outputs the motion vector data $x_{k-2}$ which is then inverted by the polarity inverting circuit 77 and thus represents movement between the frame immediately preceding that represented by the data FK and the frame immediately prior thereto. At this time, the data selector circuit 78, in response to the frame mode designating signal S2=INTPL, selects the input terminal A21, thus to output the motion vector data $[-x_{k-2}]$ provided by the polarity inverting circuit 77 as the motion vector data S23 to the movement correcting data generating circuit 63.

With reference to lines (J) and (E) of FIG. 6(B), during the interpolation frame coding mode interval $T_{PL}$, the frame-before-preceding-frame decoded data S22 then provided by the memory 62 constitutes data representing the (K−3)th frame, while the current-frame input data S4 then represents the (K−2)th frame. At the same time, the data S24 takes the form of the motion vector data $x_{k-3}$, so that the movement correcting data generating circuit 64 produces a predictive interpolation frame representative of the (K−2)th frame as the preceding frame movement correcting data representative of the (K−2)th frame as the preceding frame movement correcting data S26.

Simultaneously, the preceding frame decoded data S21 represents the (K−1)th frame, while the data S23 supplied thereto corresponds with the motion vector data $-x_{k-2}$, so that the movement correcting data generating circuit 63 also produces predictive frame data representative of the (K−2)th frame as the preceding/following frame movement correcting data S25.

For example, during the interpolation coding mode interval $T_{PL}$ when the frame data F4 is present as the input frame data S1 (refer to line (A) of FIG. 6(A)), data F2 representing the second frame is then received as the current frame input data S4 (refer to line (E) of FIG. 6(A). At this time the motion vector calculating circuit 65 provides the motion vector data $-x_2$ as the data S23 (refer to line (L) of FIG. 6(B)) to the circuit 63 for transforming the data S21 then representing the data F3 to a predictive frame corresponding with the current frame input data S4 equal to F2. At the same time, the motion vector calculating circuit 65 provides the motion vector data $x_1$ as the data S24 to the circuit 64 for transforming the data S22 therein representing the first frame to data representative of the second frame which it then supplies as the data S26.

During the interframe coding mode interval (S2=INTER), the input frame data S1 may be designated FK (K=3, 5, . . . ) and the current frame input data S4 is identical to data S1 (see line (E) of FIG. 6(A)). Simultaneously, the preceding frame decoded data S21 takes the form of the data F1U, F3U, . . . corresponding with the data F(K−2) preceding the current frame data S4 by two frames (refer to line (H) of FIG. 6(A)). During each of the interframe coding mode intervals, the data selector circuit 78 selects the input A22 corresponding with the motion vector data $x_{k-2}+x_{k-1}$ which it supplies to the movement correcting data generating circuit 63 for transforming the preceding frame decoded data S21 into data representing the Kth frame, thus providing predictive frame data based upon the uninterpolated frame data F(K−2).

For example, during the interframe interval (K=3), the input frame data S1 takes the form of the data F3 and the preceding frame decoded data S21 takes the form of the decoded data F1U, representing the frame preceding the current frame by two frame intervals (refer to lines (A) and (H) of FIG. 6(A)). Simultaneously, the motion vector calculating circuit 65 provides the motion vector data $x_1+x_2$ (refer to line (L) of FIG. 6(B)) to the circuit 63 to produce the predictive frame data S25 representing the frame (K+3) and obtained by transforming the data S21 representing the frame (K=1) with the use of motion vector data $x_1+x_2$.

In general, the predictive frame data generating circuit 66 serves to generate picture data having the least deviation from the current frame input data S4, which it provides as the predictive frame data S8 based upon the preceding/following frame movement correcting data S25 and the preceding frame movement correcting data S26. In addition, the manner in which the predictive frame data S8 is generated is dependant upon the system's mode of operation as determined by the frame mode designating signal S2. More specifically, the predictive frame data generating circuit 66 includes a data selector circuit 81 having three input terminals A31, A32, and A33 respectively provided with predictive frame data for use during the intraframe coding mode, the interframe coding mode and the interpolated frame coding mode, and an output terminal selectably connectable with each of the input terminals A31, A32 and A33 under the control of the frame mode designating signal S2 for providing the predictive frame data S8 to an output of the circuit 66. Accordingly, during the intraframe coding mode interval, the circuit 81 selects the input terminal A31 under the control of the signal S2=INTRA. The input terminal A31 is provided with blank picture data (indicated as "0" in FIG. 7(B)) continuously, so that the adaptive prediction circuit 58 provides blank picture data containing no picture information to the inverting input terminal of the subtractor circuit 42 during the intraframe coding mode (refer to FIG. 5(A). Accordingly, the subtractor circuit 42 provides the current frame input data S4 unmodified as the transmitted frame data S9 to the discrete cosine transformation circuit 43 so that intraframe coded data is delivered at the output thereof as the data S10.

During each interframe coding mode interval (S2=INTER), the data selector circuit 81 selects its input terminal A32 under the control of the signal S2=INTER for providing interframe coded picture data S32 from an interframe coding data selector circuit 82 as the predictive frame data S8. The interframe coding data selector circuit 82 is provided with a first input terminal A41 and a second input terminal A42 which are selectably connectable with an output terminal thereof to provide the interframe coded picture data S32 under the control of a control signal S35 provided by a first least correction data selector (1st L.C.D.S.) circuit 83, the operation of which is described in greater detail hereinbelow. The first input terminal A41 is provided with the blank picture data indicated as "0" in FIG. 7(B), while the second input terminal A42 is coupled with the output of the movement correcting data generating circuit 63 to receive the preceding/following frame movement correcting data S25 therefrom. The first least correction data selector circuit 83 receives detection output data S33 and S34 provided respectively by an intraframe difference detector circuit 84 and a first movement difference detector circuit 85 and, based thereon, produces the selection control signal S35 for controlling the selection of the input terminals A41 or A42 of the interframe coding data selector circuit 82.

The intraframe difference detector circuit 84 includes a transmitted unit block average circuit having an input coupled to receive the current frame input data S4 and is operative to produce data S36 representing an average value of the pixel data of each transmitted unit block of the data S4 which it provides at an output terminal thereof to a comparator circuit 87 in the form of a subtracting circuit receiving the data S36 at a noninverting input terminal thereof. An inverting input terminal of the circuit 87 is coupled to receive the current frame input data S4 and, accordingly, the comparator circuit 87 is operative to produce a series of difference signals S37. An absolute value accumulating circuit 88 accumulates a sum of the absolute values of the signals S37 to supply the signal S33 which thus represents a difference between the value of the pixels within the current frame input data S4 and the average value of the picture data which surrounds the pixels thereof. Accordingly, this difference represents the error between the picture data to be encoded for transmission and the data to be transmitted as intraframe coded data. The detection output data S33 supplied to the first least correction data selector circuit 83 thus represents the error between the data to be encoded presently for transmission and the predictive frame data obtained by decoding the intraframe coded data.

The first movement difference detector circuit 85 includes a comparator circuit 91 in the form of a subtracting circuit having a noninverting input supplied with the preceding/following frame movement correcting data S25 produced by the movement correcting data generating circuit 63. The comparator circuit 91 also has an inverting input supplied with the current frame input data S4 to produce difference data S41 at an output thereof which is supplied thereby to an average value accumulating circuit 92 which accumulates the sum of such difference data S41 to provide the detection output data S34.

During the interframe coding mode intervals, the current frame input data S4 corresponds with the frame data F3, F5 . . . , while the movement correcting data generating circuit 63 provides predictive frame data also corresponding with the data F3, F5 . . . , obtained by transforming the frame decoded data F1U, F3U, . . . , with the use of the motion vector data S23 in the form of $(x_1+x_2)$, $(x_3+x_4)$, . . . , respectively. Refer to lines (E), (H), and (L) of FIG. 6(A). Accordingly, the comparator circuit 91 of the first movement difference detector circuit 85 thus produces difference data S41 representing the error between the data S4 which it is desired to reproduce at the receiver and the picture data which would actually be transmitted as interframe coded data in the form of the motion vector data $(x_1+x_2)$, $(x_3+x_4)$, . . . , and which is then accumulated in the absolute value accumulating circuit 92 to produce the detection output data S34.

The first least correction data selector circuit 83 compares the detection output data S33 provided by the intraframe difference detector circuit 84 and the detection output data S34 provided by the first movement difference detector circuit 85 and based on this comparison generates the selection control signal S35 to control the interframe coding data selector 82 to select as the predictive frame data S8 that one of the proceeding/following frame movement correcting data S25 and the blank picture data 31 which provide the least error with respect to the current frame input data S4. Accordingly, during the interframe coding mode interval $T_{ER}$, the predictive frame data generating circuit 66 adaptively selects and delivers as the predictive frame data S8 (refer to line (N) of FIG. 6(B)) either the blank picture data or the frame data FK produced with the use of the data F(K−2) transformed by the motion vector data $(x_{k-2}+x_{k-1})$. As a result, data representing the differences between the uninterpolated frame data F1, F3, . . . and the predictive coding data supplied by the predictive frame data generating circuit 66 are provided by the subtractor circuit 42 (refer to FIG. 5(A)) to the discrete cosine transformation circuit 43 as the transmitted frame data S9 in order to supply interframe coded data representing the uninterpolated frames including the 3rd, 5th, 7th, etc., frames, to the transmission buffer circuit section 51 for transmission.

During the interpolation frame coding mode intervals (S2=INTPL), the data selector circuit 81 in response to the signal S2 selects the input terminal A33 which is coupled with an output of an interpolation frame coding data selector circuit 95 to receive interpolation frame coded picture data S45 therefrom to be supplied as the predictive frame data S8 to the subtractor circuit 42 of FIG. 5(A). The interpolation frame coding selector circuit 95 has four data input terminals A51, A52, A53, and A54, selectably connectable to an output terminal thereof under the control of a selection control signal S47 generated by a second least correction data selector circuit 99, the operation of which is described in greater detail hereinbelow. The input terminal A51 of the circuit 95 is coupled to received the blank picture data S31, the input terminal A52 of the circuit 95 is coupled with the movement correcting data generating circuit 63 to receive the preceding/following frame movement correcting data S25 therefrom, and the input terminal A53 thereof is coupled with the output of an average value calculating circuit 96, and the input terminal A54 thereof is coupled with the output of the movement correcting data generating circuit 64 to receive the preceding frame movement correcting data S26 therefrom. The average value calculating circuit 96 includes an adding circuit 97 having a first input coupled with the output of the circuit 63 to receive the data S25 therefrom and a second input coupled with the output of the circuit 64 to receive the data S26 therefrom and provides a signal representing the sum of the signals S25 and S26 to the input of a one-half divider circuit 98. The circuit 98 thus provides data S46 representing the average value of the preceding/following frame movement correcting data S25 and the preceding frame movement correcting data S26 which it provides to input terminal A53 of circuit 95.

The second least correction data selector circuit 99 generates the selection control signal S47 based upon the relative values of the control signal S33 provided by the intraframe difference detector circuit 84 and the control signal S34 provided by the first movement difference circuit 85, together with the values of detection output data S50 provided by a second movement difference detector circuit 101 and the value of detection output data S55 provided by a third movement difference detector circuit 105. As explained in greater detail below, the second least correction data selector circuit 99 is thus enabled to adaptively select picture data for transmission which is capable of reproducing an interpolated picture of the highest quality at the receiver.

The second movement difference detector circuit 101 includes a comparator circuit 102 in the form of a subtracting circuit having a noninverting input terminal coupled to receive the preceding frame movement correcting data S26 from the movement correcting data generating circuit 64 and an inverting input terminal coupled to receive the current frame input data S4, thus to produce difference data S51 at an output terminal thereof representing the differences between respective portions of the data S26 and S4. The circuit 101 also includes an average value accumulating circuit 103 having an input coupled with the output terminal of the comparator circuit 102 to receive the difference data S51 therefrom and is operative to accumulate the absolute values thereof thus to produce the detection output data S50 at an output terminal of the second movement difference detector circuit 101. Accordingly, the detection output data S50 represents the amount of error between the preceding frame movement correcting data S26 and the current frame input data S4.

The third movement difference detector circuit 105 includes a comparator circuit 106 in the form of a subtracting circuit having a noninverting input terminal coupled with the output terminal of the average value calculating circuit 96 to receive the average movement correcting data S46 therefrom, and an inverting input terminal coupled to receive the current frame input data S4. The comparator circuit 106 produces difference data S56 at an output terminal thereof which, accordingly, represents the differences between respective portions of the signals S46 and S4. The output terminal of the comparator circuit 106 is coupled with the input of an average value accumulating circuit 107 which is operative to accumulate the absolute value of the various difference data S56 which it outputs as the detection output data S55 of the third movement difference detector circuit 105. Accordingly, the detection output data S55 represents the accumulated error between the average movement correcting data S46 and the current frame input data S4.

During the interpolation frame coding mode intervals, in the event that the detection output data S33 provided by the intraframe difference detector circuit 84 represents the smallest error value when compared with the data S34, S50 and S55, the second least correction data selector circuit 99 generates the selection control signal S47 in a form which causes the interpolation frame coding selector circuit 95 to select the blank picture data S31 for output to the data selector circuit 81 which in turn provides the same as the predictive frame data S8 to the subtractor circuit 42. Accordingly, the discrete cosine transformation circuit 43 receives the unmodified current frame data S4 which it then transforms to produce the intraframe coded data S10 for transmission to the reception section 15 (refer to FIG. 4) as a respective one of the interpolated frames F2, F4, . . . .

However, in the event that the detection output data S34 provided by the first movement difference detector circuit 85 possess the least error as compared with the signals S34, S50 and S55, the second least correction data selector circuit 99 produces the selection control signal S47 in a form which causes the circuit 95 to select the input terminal A52 thus to provide the preceding/following frame movement correcting data S25 as the predictive frame data S8 at that time. With reference to lines (E) and (H) of FIG. 6(A), it will be seen that during the interpolation frame coding mode intervals $T_{PL}$, the current frame input data S4 takes the form of the frame data F(K−2) (where S1=FK) while the preceding frame decoded data S21 takes the form of the decoded frame data F(K−1). Accordingly, where the detection output data S34 possesses the smallest value of the detection data provided to the second least correction data selector circuit 99, this indicates that the motion vector data $[-x_{k-2}]$ provides the most accurate data which if transmitted to the reception section 15 (refer to FIG. 4) will produce the highest quality picture for the corresponding interpolated frame. Therefore, the movement correcting data generating circuit 63 outputs the preceding/following frame movement correcting data S25 as the predictive frame data S8 to the subtractor circuit 42 and, as described more fully hereinbelow, the motion vector data $[-x_{k-2}]$ is transmitted as a component of DATA for use in reconstructing the data of the interpolation frame F(K−2) in the reception section 15.

If, however, the detection output data S50 produced by the second movement difference detector circuit 101 possesses the smallest value as compared with the detection output data S33, S34 and S55, the second least correction data selector circuit 99 produces the selection control signal S47 in a form which causes the circuit 95 to select the input terminal A54 thus to provide the preceding frame movement correcting data S26 through the data selector circuit 81 as the predictive frame data S8. With reference to lines (E) and (J) of FIG. 6(A), it will be seen that during the interpolation frame coding mode intervals $T_{PL}$, the current frame input data S4 takes the form of the frame data F(K−2), while the frame-before-preceding-frame decoded data S22 takes the form of the frame data F(K−3). Accordingly, when the detection output data S50 possesses the smallest value as set forth above, this indicates that the motion vector data $x_{k-3}$ is the most accurate motion vector data available for reproducing a picture of the best quality at the reception section 15. Accordingly, while the preceding frame movement correcting data S26 is supplied as the predictive frame data S8, the motion vector data $x_{k-3}$ is simultaneously transmitted as a component of DATA to the reception section 15.

However, in the event that the detection output data S55 produced by the third movement difference detector circuit 105 produces the smallest value as compared with the detection output data S33, S34 and S50, the second least correction data selector circuit 99 produces the selection control signal S47 in a form which causes the interpolation frame coding selector circuit 95 to select the input terminal A53 thus to provide the average movement correcting data S46 supplied by the average value calculating circuit 96 as the predictive frame data S8. With reference to lines (E), (H) and (J) of FIG. 6(A), at this time the current frame input data S4 takes the form of the frame data F(K−2), while the preceding frame decoded data S21 takes the form of the frame data F(K−1)U and the frame-before-preceding-frame decoded data S22 takes the form of the frame data F(K−3)U. With reference also to lines (L) and (M) of FIG. 6(B), simultaneously the data selector circuits 78 and 76 of the motion vector data calculating circuit 65 provide the motion vector data $[-x_{k-2}]$ and $x_{k-3}$, respectively. Consequently, at this time the movement correcting data generating circuit 63 outputs the preceding/following frame movement correcting data S25 representing the frame decoded data F(K−2)U by transforming the preceding frame decoded data S21 representing the frame data F(K−1)U with the use of the motion vector data $[-x_{k-2}]$. At the same time, the movement correcting data generating circuit 64 provides the preceding frame movement correcting data S26 in the form of frame decoded data F(K−2)U obtained by transforming the preceding frame decoded data S22 in the form of the decoded data F(K−3)U with the use of the motion vector data $x_{k-3}$. Accordingly, the average movement correcting data S46 then takes the form of the average value of the framedecoded data F(K−2)U provided by the movement correcting data generating circuits 63 and 64 as the predictive frame data S8. Simultaneously therewith, the motion vector data $(x_{k-3}, -x_{k-2})$ is transmitted as a component of DATA to the reception section 15 as the most accurate motion vector data capable of reproducing the current interpolated frame with the best quality.

Under optimal conditions, at least one of the detection output data S34, S50 and S55 has a "0" value indicating that the respective predictive picture data, S25, S26 or S46 generated in accordance with the corresponding motion vector data to be transmitted agrees with the current frame input data S4 represented thereby. Accordingly, the predictive picture data S8 supplied by the predictive frame data generating circuit 66 to the subtractor circuit 42 (refer to FIG. 5(A)) is identical with the current frame input data S4, so that the content of the transmitted frame data S9 is 0. Accordingly, the discrete cosine transformation circuit 33 generates no error data to be transmitted as the transformed output data S10, and thus, the transmitted data combining circuit 46 need only deliver the motion vector data to the buffer memory 52 as picture data for the corresponding interpolated frame. Consequently, the quantity of the data to be transmitted can be substantially decreased. At the same time, the transmitted motion vector data will permit reproduction of a picture having good quality through an interpolation calculation carried out in the reception section 15.

In the event, however, that one of the detection output data S34, S50 and S55 while providing the smallest error is nevertheless a non-zero value, this indicates that the current frame input data S4 differs to some extent with the respective one of the selected predictive frame data S25, S26 or S46 resulting from an error included in the corresponding motion vector. The predictive frame data generating circuit 66 delivers the predictive picture data including the error to the subtractor circuit 42 as the predictive frame data S8, and thereby, picture data corresponding to the error is supplied to the discrete cosine transformation circuit 43 as the transmitted frame data S9. Accordingly, the transmitted data conning circuit 46 transmits the picture data corresponding to the error together with the selected motion vector data to the reception side of the system. By thus providing the error data to the reception side, it is enabled to correct the error introduced by the motion vector so that picture data of good quality can be reproduced therein.

As noted hereinabove, the transmission data combining (T.D.C.) circuit 46 assembles the DATA in a form suitable for transmission. The DATA so assembled includes the error data encoded in the form of the data S13 provided by the run-length Huffman coding circuit 150 together with motion vector data. The transmission data combining circuit 46 combines the motion vector data with additional data in order to form header data $D_{HD}$. The header data $D_{HD}$ also includes frame mode data indicating the coding method used to produce each frame of the transmitted data, predictive mode data indicating the kind of picture data predicted to be optimum by the adaptive predictive data generating circuit section 41 (except for intraframe coded frames) together with quantization width data provided by the quantization circuit 44 for indicating the coding width used thereby. More specifically, for each interpolation frame coding mode interval $T_{PL}$ the predictive mode data indicates whether the interpolation frame coding data selector circuit 95 has selected the picture data S31, S25, S26 or S46. For each interframe coding mode interval $T_{ER}$, the predictive mode data indicates whether the interframe coding data selector circuit 82 selected the data S31 or S25.

Figure 8A:
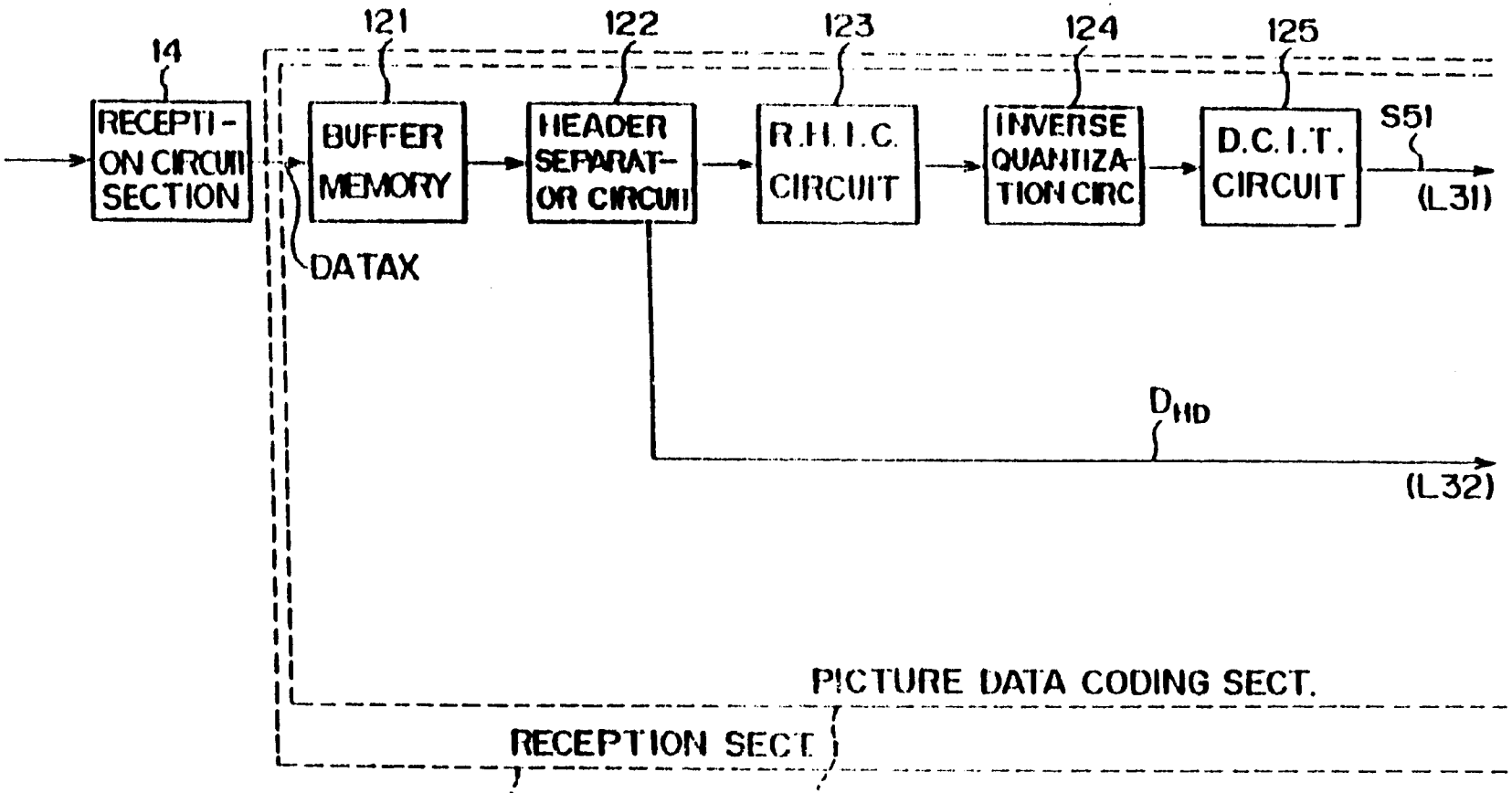
FIGS. 8(A), 8(B) are block diagrams of a receiving section included in the system of FIG. 4.
Figure 8B:
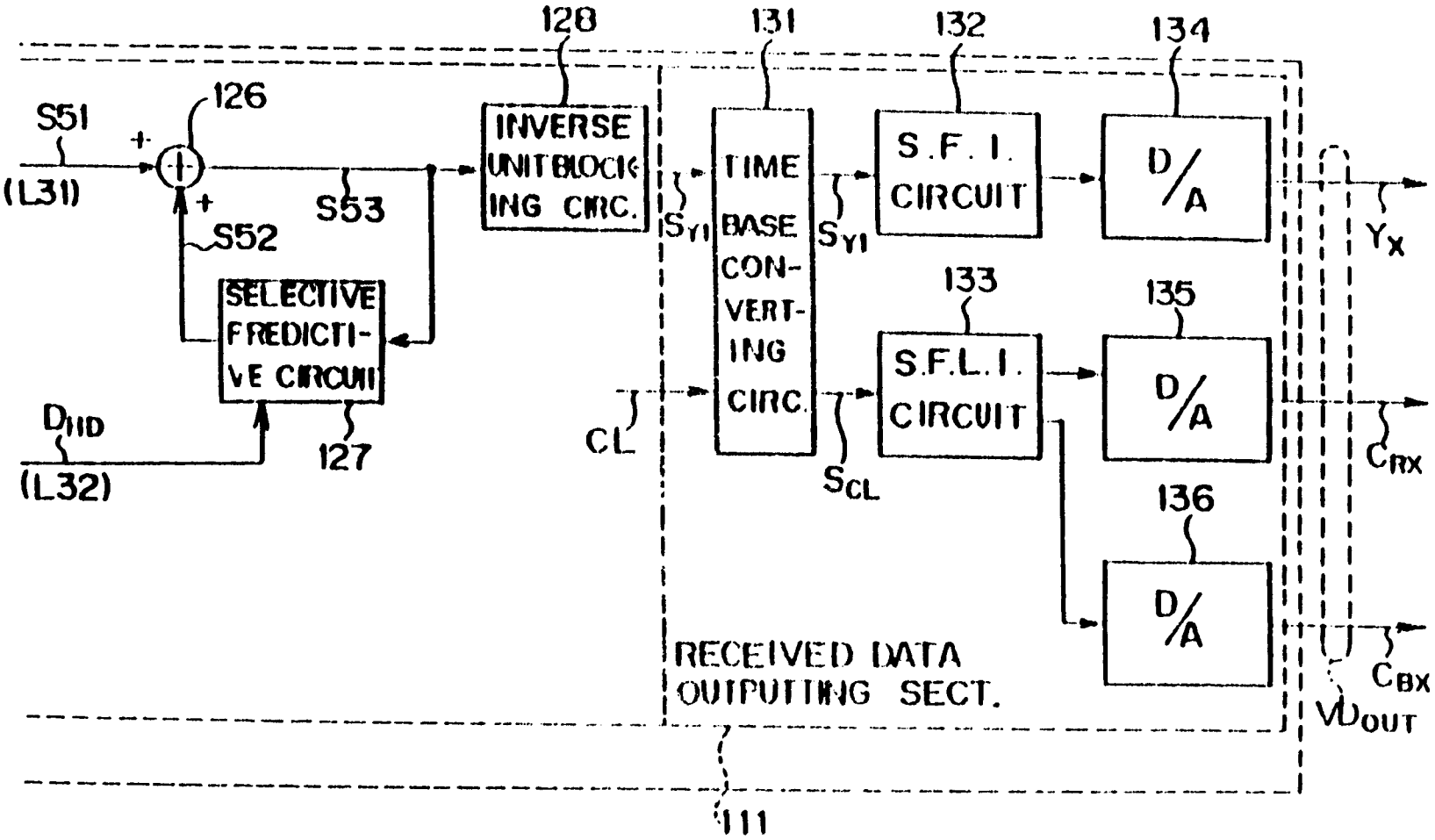

With reference now to FIGS. 8(A), 8(B), the reception section 15 as illustrated therein receives the reception data DATAX provided at the output terminal of the reception circuit section 14 and inputs this data to a buffer memory 121 of a picture data coding section 110 of the reception section 15. Subsequently, the reception data DATAX is read out by the buffer memory 121 to the input of a header separator circuit 122 which serves to separate the header data $D_{HD}$ and provides the remaining data to successive inverse conversions carried out by a run-length Huffman inverse coding (R.H.I.C.) circuit 123, an inverse quantization circuit 124 and a discrete cosine inverse transformation (D.C.I.T.) circuit 125 from which reception frame data S51 thus obtained is provided to a first input terminal of an adder circuit 126. The header data $D_{HD}$ is provided to an input of a selective predictive circuit 127 having a second input connected with an output terminal of the adder circuit 126 and an output terminal connected with a second input terminal of the circuit 126. The selective predictive circuit 127 detects the predictive conversion information included in the header data $D_{HD}$ for generating selective predictive data S52 in accordance with such predictive conversion information which it then supplies to its output terminal as the selected predictive data. This selected predictive data is then added by the adding circuit 126 to the decoded picture data S51 constituting the difference data previously encoded by the transmitter, thus to provide reproduced data S53 at the output of the adding circuit 126.

The reproduced picture data S53 is provided to the input of an inverse unit blocking circuit 128 which processes the data S53 to obtain picture data in the same format as that of the data previously supplied to the unit blocking circuit 33 of the transmission section 11. The reformatted data is output by the inverse unit blocking circuit 128 to an input terminal of a received data outputting section 111 where it is received initially by a time base converting circuit 131 thereof. The time base converting circuit 131 carries out a time base conversion of the picture data supplied from the inverse unit blocking circuit 128 in accordance with a predetermined clock signal CL to thereby reproduce the luminance signal (designated $S_{Y1}$) and the chrominance signal (designated $S_{CL}$). The luminance signal is supplied to a single field interpolation (S.F.I.) circuit 132 for recovering the original format thereof, while the chrominance signal is supplied to a single field line interpolation circuit 133 for the same purpose. The luminance signal thus reformatted by the circuit 132 is supplied thereby to a digital-to-analog convertor circuit 134 for converting the same to an analog luminance signal $Y_x$. The reformatted chrominance signals supplied by the signal field line interpolation circuit 133 are provided to respective digital-to-analog convertor circuits 135 and 136 which output chrominance signals $C_{RX}$ and $C_{BX}$, respectively. The luminance signal $Y_x$ together with the chrominance signals $C_{RX}$ and $C_{BX}$ constitute the output signal $VD_{OUT}$ provided by the received data output section 111.

With reference again to FIG. 4, in the embodiment of the present invention disclosed herein, the moving picture input signal $VD_{IN}$ received by the transmission section 11 is rearranged by the picture data input section 21 and supplied thereby to the picture data coding circuit section 31 in the form of picture data PIC. The picture data coding circuit section 31 arranges the picture data in the order of the 0th, 1st, 2nd, 3rd, 4th, . . . frames represented respectively by the frame data F0, F1, F2, F3, F4, . . . , designated the input frame data S1, and under the control of the frame mode designating signal S2, encodes the data F1 of the first frame by high efficiency coding according to an intraframe coding process. Thereafter, the data of every other even numbered frame, that is, the data of the 2nd, 4th, 6th, . . . frames F2, F4, F6, . . . , are encoded according to an interpolation frame coding process. Meanwhile, the data of the odd numbered frames succeeding the first frame, that is, the 3rd, 5th, 7th, . . . frames represented by the data F3, F5, F7, . . . are subjected to a high efficiency interframe coding process.

More specifically, and with reference to FIG. 5(A), the input frame data S1 (refer to line (A) of FIG. 6(A)) are rearranged by the data selector circuit 34 and the interpolated frame input memory 35, so that even numbered frame data F0, F2, F4, F6, . . . , are time shifted by two frames, while the remaining data of the odd numbered frames F1, F3, F5, . . . are not shifted in time, so that the current frame input data S4 having a data sequence F1, F0, F3, F2, F5, . . . is obtained. This data is supplied to the subtractor circuit 42 and to the adaptive prediction circuit 58 of the adaptive predictive data generating circuit 41. In addition, the frame data encoded for transmission to the reception section is decoded in the adaptive predictive generating circuit 41 and utilized to produce predictive picture data which it is determined therein will reproduce pictures of the best quality for each frame upon reception, so that motion vector data and error data corresponding to each of the selected predictive picture data is transmitted to the receiver side.

The adaptive prediction circuit 58 permits each frame of the current frame decoded data S15 to be retained in the preceding frame memory 61 for two frame intervals and, thereafter to be retained for an additional two frame intervals in the frame-before-preceding-frame memory 62. This data is provided by the memory 61 in the form of the preceding frame decoded data S21 (refer to line (H) of FIG. 6(A)) and by the memory 62 as the frame-before-preceding-frame decoded data S22 (refer to line (J) of FIG. 6(A)). The data S21 and S22 are transformed based upon the motion vector data successively produced by the motion vector calculating circuit 65 for generating various sets of predictive picture data for each frame and, of these, the optimum picture data is supplied to the subtractor circuit 42 as the predictive frame data S8. Accordingly, the current frame input data S4 and the predictive picture data produced with the use of the motion vector data are employed to produce picture data representative of the differences therebetween which, combined with the motion vector data, are transmitted to the receiver side.

Initially, during the intraframe coding mode interval $T_{RA}$ when the data F1 of the first frame is provided as the input frame data S1 (refer to line (A) of FIG. 6(A)), the data selector circuit 81 of the predictive frame data generating circuit 66 (illustrated in FIG. 7(B)) selects the blank picture data S31 provided at the first input terminal A31 of the circuit 81 to be provided as the predictive frame data (refer to line (N) of FIG. (B)). Accordingly, the subtractor circuit 42 provides the data F1 of the first frame without modification as the transmitted frame data S9, so that the transmission section produces the transmitted DATA including this intraframe coded data.

During the second frame which is an interpolation frame coding mode interval $T_{PL}$ (S1=F2), the data selector circuit 81 of the predictive frame data generating circuit 66 outputs the interpolation frame coded picture data S45 from the interpolated frame coding selector circuit 95 as the predictive frame data S8. Simultaneously, the data F0 is provided as the current frame input data S4 (refer to line (E) of FIG. 6(A)), while the frame data F1U is output as the preceding frame coded S21 of the preceding frame memory 61 (refer to line (H) of FIG. 6(A)). During the same interval, the motion vector calculating circuit 65 provides the motion vector data $-x_0$ through the input terminal A21 of the data selector circuit 78 as the correcting motion vector data S23 (refer to line (L) of FIG. 6(B)). Simultaneously, the decoded data F(−1)U representing the frame preceding the 0th frame is stored in the frame-before-preceding-frame memory 62.

Accordingly, during the second frame (S1=F2), the interpolation frame coding selector circuit 95 of the predictive frame data generating circuit 66 is supplied with input data including (i) the blank picture data S31, (ii) the preceding/following frame movement correcting data S25 in the form of the frame data F0 produced by transforming the data F1 with the use of the motion vector data $-x_0$, (iii) the preceding frame movement correcting data S26 in the form of the frame data F0 produced by transforming the data F(−1) with the use of the motion vector data $x_{-1}$, and (iv) the average movement correcting data S46 in the form of the average value of the frame data F0 as produced by transforming the data F1 as in (ii) and as produced by transforming the data F(−1) as in (iii) above. Of the above data, (i)–(iv), that providing the least error is selected by the second least correction data selector circuit 99 to be output by the predictive frame data generating circuit 66 as the predictive frame data S8.

The transmitted frame data S9 output by the subtractor circuit 42 thus represents the error of the predictive frame data S8 with respect to the current frame input data S4. The transmitted frame data S9 encoded in the form of the data S13 is then combined with the header data $D_{HD}$ by the transmission data combining circuit 46 to produce the signal DATA subsequently output by the buffer memory 52. The header data $D_{HD}$ includes both predictive conversion information in the form of the motion vector data corresponding with the predictive frame data S8 together with the predictive mode data indicating the type of frame data selected by the circuit 58. Subsequently during the third frame interval which is an interframe coding mode interval $T_{ER}$ (S1=F3), the current frame input data S4 takes the form of the data F3 representing the third frame. At the same time, the preceding frame decoded data S21 provided by the preceding frame memory 61 takes the form of the data F1U representing the first frame. Meanwhile, the motion vector calculating circuit 65 provides the motion vector data $(x_1+x_2)$ as the correcting motion vector data S23 (refer to line (L) of FIG. 6(B)). Accordingly, the movement correcting data generating circuit 63 is then operative to provide predictive picture data F3 representing the third frame as the data S25 by transforming the data F1U of the preceding frame decoded data S21 with the use of the motion vector data $(x_1+x_2)$.

During each interframe coding mode interval, the data selector circuit 81 outputs the data received at its input terminal A32 in the form either of the blank picture data S31 or the predictive picture data F3 based on the data F1U depending on the state of the interframe coding data selector circuit 82, as the predictive frame data S8 (refer to line (N) of FIG. 6). If the error inherent in the motion vector data $(x_1+x_2)$ is relatively small, then the difference between the predictive picture data F3 (based on F1U) and the current frame input data S4 becomes sufficiently small so that it is less than that represented by the output of the intraframe difference detector circuit 84. In that event, the predictive picture data F3 based on F1U is selected by the first least correction data priority circuit 83 and supplied to the subtractor circuit 42 as the predictive frame data S8.

Thus, the error data produced by the subtractor circuit 42, together with the header data $D_{HD}$ including the predictive conversion information, namely the motion vector data $(x_1+x_2)$ and the predictive mode data indicating that the predictive picture data F3 based on F1U was selected as the predictive frame data S8, is delivered from the transmission section via the transmission path 13 to the reception section 15.

When, however, the error inherent in the motion vector data ($x_1+x_2$) exceeds the value output by the intraframe difference detector circuit 84 and is too great to be neglected, this condition is detected by the first least correction data priority circuit 83 and the blank picture data is instead output as the prediction frame data S8. In that event, the picture data transmitted by the transmission section 11 takes the form of intraframe coded data. In this manner, the reception section 15 is enabled to reproduce a high quality picture.

During the fourth frame when the input frame data S1 is equal to F4, the data F2 of the second frame is received as the current frame input data S4 (refer to line (E) of FIG. 6(A)), while the preceding frame decoded data S21 (see line (H) of FIG. 6(A) equals the decoded data F3U and the frame-before-preceding-frame decoded data S22 (see line (J) of FIG. 6(B)) equals the decoded data F1U. At the same time, the motion vector calculating circuit 65 delivers the motion vector data $-x_2$ as the correcting motion vector data S23 (see line (L) of FIG. 6(B)) and it also delivers the motion vector data $x_1$ as the correcting motion vector data S24 (see line (M) of FIG. 6(B)).

As a result, the movement correcting data generating circuit 63 delivers the preceding/following frame movement correcting data S25 obtained by transforming F3U provided as the preceding frame decoded data S21 with the use of the motion vector data $-x_2$. At the same time, the movement correcting data generating circuit 64 provides the preceding frame movement correcting data S26 obtained by transforming F1U provided as the frame-before-preceding-frame decoded data S22 with the use of the motion vector data $x_1$. Simultaneously, the average value calculating circuit 96 delivers the average movement correcting data S46 in the form of a predictive picture data F2, which is the average value of the picture data F2 based on F3U and in the form of the preceding/following frame movement correcting data S25 and the predictive picture data F2, based on F1U and in the form of the preceding frame movement correcting data S26 (refer to line (N) of FIG. 6(B)).

Thus, during the 4th frame as illustrated in line (N) of FIG. 6(B), the interpolation frame coding data selector circuit 95 is supplied with (i) the blank picture data S31, (ii) the predictive picture data F2 based on the data F3U representing the third frame and the motion vector data $-x_2$, (iii) the predictive picture data F2 based on the data F1U representing the first frame and the motion vector data $x_1$, and (iv) the predictive picture data F2 obtained by calculating the average of the predictive picture data F2 based on F3U and F2 based on F1U, and of these data, that producing the least error is selected by the second least correction data selector circuit 99 as the predictive frame data S8. More specifically, if the second least correction data selector circuit 99 determines that the error between (i) the predictive picture data F2 based on F3U and (ii) the data F2 provided as the current frame input data S4, is the smallest of all four, the predictive frame data generating circuit 66 provides the predictive picture data F2 based on F3U as the predictive frame data S8. Thereby the correcting data corresponding to this error can be obtained by subtraction as the transmitted frame data S9. The transmission section 11 is thus able to transmit the picture data representative of this error, together with the header data $D_{HD}$ including the movement correcting vector data $-x_2$ and the predictive mode data indicating that the data of the third frame is to be used for predictive conversion. Thus, the reception section 15 is able to reproduce the second frame of the picture by means of the motion vector data $-x_2$ corresponding to the movement between the second and third frames thereof.

On the other hand, when the second least correction data selector circuit 99 determines that the difference between the predictive picture data F2 based on F1U and the data F2 provided as the current input data S2 is the smallest of the four values, the predictive frame data generating circuit 66 supplies the predictive picture data F2 based on F1U to the subtractor circuit 42 as the predictive frame data S8. Accordingly, the transmission section 11 transmits the picture data representing the error between the predictive picture data F2 based on F1U and the data S4 together with the header data $D_{HD}$ including the motion vector data $x_1$ and the predictive mode data indicating that the data of the first frame is to be used for predictive conversion. The reception section 15 is then able to reproduce the second frame of the picture by transforming the data of the first frame with the use of the motion vector data $x_1$.

Further, when the second least correction data circuit 99 determines that the average movement correcting data S46 obtained from the average value calculating circuit 96 provides the minimum error, the predictive frame data generating circuit 66 delivers the predictive picture data F2 based on both F3U and F1U as the predictive frame data S8. Accordingly, the transmission section 11 transmits picture data representing the error between (i) the average value of the predictive data for the second frame obtained by transforming the data F1U and F3U using the motion vector data $x_1$ and $-x_2$, and (ii) the current frame input data S4 in the form of the data F2, together with the header data $D_{HD}$ including $x_1$ and $-x_2$ and the predictive mode data indicating that the average movement correcting data S46 has been selected as the predictive frame data. Consequently, the reception section 15 performs an interpolation calculation of the average value of the data representing the second frame by transforming the data F3 and F1 with the use of the motion vector data $-x_2$ and $x_1$, respectively, to thereby obtain the data representing the second frame. In the described manner, the reception section 15 is enabled to reproduce the picture data in accordance with the transmitted data which has been adaptively selected. Since the transmission section 11 transmits the picture data which produces the least error, the reception section is thus able to reproduce a high quality picture.

Likewise, during the interframe coding mode intervals $T_{ER}$ when the input frame data S1 takes the form of the data F5, F7, . . . , the same operation as described above with respect to the data F3 representing the third frame is carried out, whereas during the interpolation frame coding mode intervals $T_{PL}$ when the data to be transmitted represents the 6th, 8th, . . . frames, the same transmission process as described above with respect to the 4th frame is carried out.

In accordance with the above described features of the present invention, a plurality of predictive picture data are generated for each frame of the data to be transmitted and the predictive picture data providing the least error as compared with the current frame input data is used to encode the data to be transmitted. In this manner, a high quality picture can be reliably reproduced by a receiver, while the data transmission rate is advantageously minimized.

It will be appreciated that the foregoing method may be carried out with the use of either or both of hard wired digital circuits and/or programmable apparatus.

Although a specific embodiment of the invention has been described in detail herein with reference to the accompanying drawings, it is to be understood that the invention is not limited to such embodiment, and that various changes and modifications may be effected therein by one skilled in the art without departing from the scope or spirit of the invention as defined in the appended claims.

What is claimed is:

1. In a method for encoding successive frames of a digital motion video signal in the form of compressed digital data including an intraframe coded signal and a plurality of interframe coded signals, said method comprising the steps of:

encoding a first frame of said digital motion video signal in the form of one of an intraframe coded signal and an interframe coded signal to produce a compressed digital signal;

decoding said compressed digital signal to form a decoded signal;

producing a plurality of predicted video signal frames representing a second frame of said digital motion video signal other than said first frame, at least one of said plurality of predicted video signal frames being produced with the use of said decoded signal and a motion vector representing motion between frames of said digital motion video signal, a further one of said plurality of predicted video signal frames being produced as an average value of a first interframe coded signal based on a frame of said digital motion video signal preceding said second frame and a second interframe coded signal based on a frame of said digital motion video signal following said second frame;

comparing said plurality of predicted video signal frames with said second frame of said digital motion video signal for producing a plurality of difference data each corresponding with a respective one of said plurality of predicted video signal frames;

selecting one of said predicted video signal frames having a smallest corresponding difference data; and generating an interframe coded signal of said compressed digital data corresponding to the selected one of said predicted video signal frames.

2. In a method according to claim 1, wherein the step of producing a plurality of predicted video signal frames comprises transforming said decoded signal with the use of said motion vector to produce said at least one of said plurality of predicted video signal frames.

3. In a method according to claim 2, wherein the step of encoding a first frame of said digital motion video signal comprises encoding a frame thereof preceding said second frame.

4. In a method according to claim 2, wherein the step of encoding a first frame of said digital motion video signal comprises encoding a frame thereof following said second frame.

5. In a method according to claim 2, wherein the step of encoding a first frame of said digital motion video signal comprises encoding said first frame in the form of an intraframe coded signal.

6. In a method according to claim 1, wherein the step of encoding a first frame of said digital motion video signal comprises encoding said first frame in the form of an interframe coded signal wherein said first frame follows said second frame.

7. In a method according to claim 1, wherein the step of encoding a first frame of said digital motion video signal comprises encoding said first frame in the form of an interframe coded signal wherein said first frame precedes said second frame.

8. A method for encoding successive frames of a digital motion video signal in the form of compressed digital data, comprising the steps of:

encoding a first frame of said digital motion video signal in the form of one of an intraframe coded signal and an interframe coded signal to produce a first compressed digital signal;

decoding said first compressed digital signal to form a decoded signal;

producing at least one predicted video signal frame representing a second frame with the use of said decoded signal and a motion vector representing motion between the first and second frames;

comparing the at least one predicted video signal frame with the second frame to produce first difference data representing differences therebetween;

providing an interframe coded signal including said motion vector to represent said second frame if the difference data is less than a predetermined value; and providing an intraframe coded signal to represent said second frame if said difference data exceeds said predetermined value.

9. The method of claim 8, wherein the step of providing said interframe coded signal comprises forming second difference data between said second frame and said at least one predicted video signal frame, and compressing the second difference data to form second compressed data.

10. The method of claim 8, wherein the step of comparing the at least one predicted video signal frame with the second frame comprises subtracting one of the at least one predicted video signal frame and the second frame from the other thereof to produce a plurality of difference data and accumulating said plurality of difference data to form said first difference data.

*11. In a method for encoding successive frames of a digital motion video signal, said successive frames including a first, a second and a third frame, said second frame following said first frame and said third frame following said second frame, said method comprising the steps of:*

*encoding said first frame in the form of one of an intraframe coded signal and an interframe coded signal to produce a first compressed digital signal;*

*decoding said first compressed digital signal to form a first decoded signal;*

*encoding said third frame in the form of said interframe coded signal to produce a second compressed digital signal;*

*decoding said second compressed digital signal to form a second decoded signal;*

*selectively providing one of a plurality of predicted video signals representing a portion of said second frame, at least one of said plurality of predicted video signals being produced with the use of said first decoded signal and a motion vector representing motion between said first frame and said second frame, a further one of said plurality of predicted video signals being produced as an average value of a portion of said first decoded signal and a portion of said second decoded signal; and*

*generating a compressed digital signal corresponding to said portion of said second frame with the use of said provided one of said predicted video signals.*

*12. In a method according to claim 11, wherein the step of selectively providing includes movement correcting said portion of said first decoded signal with the use of said motion vector to produce said at least one of said plurality of video signals.*

*13. In a method according to claim 11, wherein the step of selectively providing includes movement correcting said*

*portion of said first decoded signal with the use of said motion vector and movement correcting said portion of said second decoded signal with the use of another motion vector representing motion between said second frame and said third frame to produce said further one of said plurality of predicted video signals.*

* * * * *